United States Patent
Paz et al.

(10) Patent No.: US 12,238,710 B2
(45) Date of Patent: Feb. 25, 2025

(54) USER EQUIPMENT INDICATION OF CODE BLOCK MAPPING TYPE PREFERENCE FOR PHYSICAL DOWNLINK SHARED CHANNEL

(71) Applicant: QUALCOMM Incorporated, San Diego, CA (US)

(72) Inventors: Daniel Paz, Geva Carmel (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 17/656,403

(22) Filed: Mar. 24, 2022

(65) Prior Publication Data

US 2023/0309095 A1    Sep. 28, 2023

(51) Int. Cl.
*H04W 72/0446* (2023.01)
*H04W 72/12* (2023.01)
*H04W 72/1273* (2023.01)
*H04W 72/21* (2023.01)
*H04W 72/23* (2023.01)
*H04W 72/542* (2023.01)

(52) U.S. Cl.
CPC ... *H04W 72/1273* (2013.01); *H04W 72/0446* (2013.01); *H04W 72/21* (2023.01); *H04W 72/542* (2023.01)

(58) Field of Classification Search
None
See application file for complete search history.

(56) References Cited

U.S. PATENT DOCUMENTS

| | | | |
|---|---|---|---|
| 2014/0341050 A1* | 11/2014 | Luo | H04L 5/0053 370/252 |
| 2017/0142593 A1* | 5/2017 | Seo | H04L 5/0044 |
| 2018/0092126 A1* | 3/2018 | Yi | H04W 74/006 |
| 2019/0132094 A1* | 5/2019 | Uchino | H04L 27/263 |
| 2019/0200348 A1 | 6/2019 | Chae et al. | |
| 2019/0288797 A1* | 9/2019 | Guan | H04L 1/1896 |
| 2020/0136778 A1* | 4/2020 | Takeda | H04L 5/0053 |
| 2020/0296591 A1* | 9/2020 | Alriksson | H04W 74/0808 |

(Continued)

OTHER PUBLICATIONS

International Search Report and Written Opinion—PCT/US2023/063916—ISA/EPO—Jun. 19, 2023.

(Continued)

*Primary Examiner* — Duc T Duong
(74) *Attorney, Agent, or Firm* — Arent Fox, LLP

(57) ABSTRACT

In a wireless communication system, dynamic changes of a code block (CB) to resource element (RE) mapping type may improve decoding performance in some scenarios. A user equipment may provide an indication of a preferred CB mapping type. A base station may transmit a physical downlink shared channel (PDSCH) based on a first dynamic CB mapping type in one or more slots. A UE may receive the PDSCH and determine a second CB mapping type that is preferred by the UE based on a metric. The UE may transmit an indicator of the second CB mapping type, for example, as a one-bit or two-bit indicator, which may be coupled with a channel state information (CSI) report or signaled in uplink control information (UCI) independently from a CSI report. The base station may consider the indicator when selecting a new dynamic CB mapping type for the UE.

45 Claims, 14 Drawing Sheets

(56) References Cited

U.S. PATENT DOCUMENTS

| | | | | |
|---|---|---|---|---|
| 2021/0112538 A1* | 4/2021 | Kim | .......................... | H04L 1/04 |
| 2021/0320755 A1* | 10/2021 | Faxer | ..................... | H04L 1/1887 |
| 2023/0076705 A1* | 3/2023 | Elshafie | ................ | H04W 24/10 |
| 2023/0089599 A1* | 3/2023 | Elshafie | ................ | H04L 5/0057 |
| | | | | 370/328 |
| 2023/0139269 A1* | 5/2023 | MolavianJazi | ....... | H04L 5/0053 |
| | | | | 370/329 |
| 2024/0097830 A1* | 3/2024 | Hooli | .................... | H04L 1/1854 |

OTHER PUBLICATIONS

LG Electronics: "Discussion on Codeword Mapping", 3GPP TSG RAN WG1 Meeting #90, R1-1713135, 3rd Generation Partnership Project, Mobile Competence Centre, 650, Route Des Lucioles, F-06921 Sophia-Antipolis Cedex, France, vol. RAN WG1, No. Prague, Czechia, Aug. 21, 2017-Aug. 25, 2017, Aug. 20, 2017, XP051315944, 5 pages.

Potevio: "Discussion on Codeword Mapping", 3GPP TSG RAN WG1 Meeting #90, R1-1714203, 3rd Generation Partnership Project, Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017, XP051316992, 3 pages.

\* cited by examiner

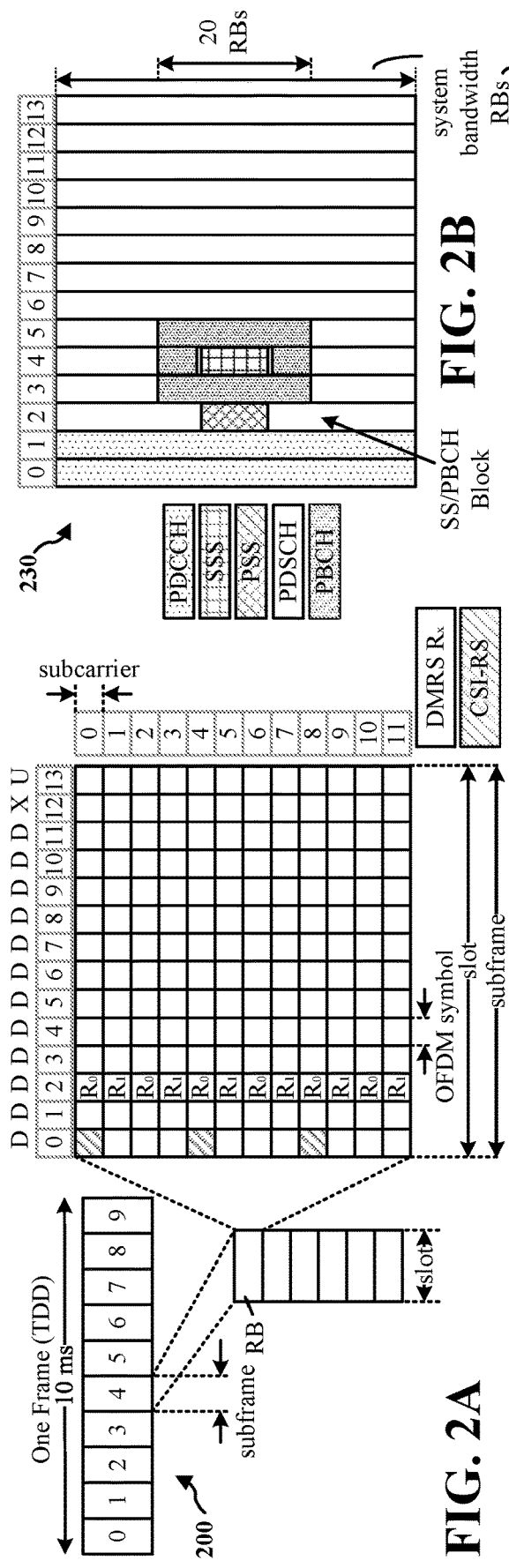
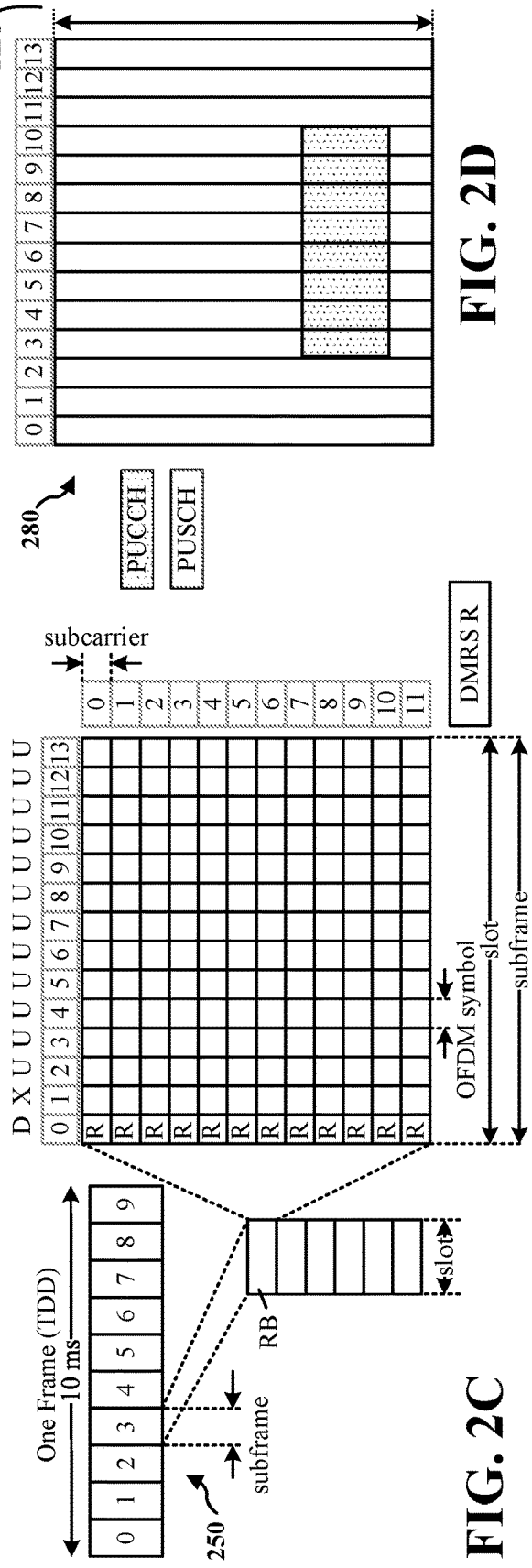

USER EQUIPMENT INDICATION OF CODE BLOCK MAPPING TYPE PREFERENCE FOR PHYSICAL DOWNLINK SHARED CHANNEL

BACKGROUND

Technical Field

The present disclosure relates generally to communication systems, and more particularly, to user equipment (UE) indication of code block (CB) mapping type preference for physical downlink shared channel (PDSCH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium, and an apparatus for a user equipment (UE) are provided. The method includes receiving a physical downlink shared channel (PDSCH) in one or more slots based on a first dynamic code block (CB) mapping type. The method includes transmitting an indicator of a second CB mapping type that is preferred by the UE based on a metric.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

In another aspect, the disclosure provides a method, a non-transitory computer-readable medium, and an apparatus for a base station. The method includes transmitting a PDSCH based on a first dynamic CB mapping type in one or more slots. The method includes receiving an indicator that a second CB mapping type is preferred by a UE.

The present disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of downlink (DL) channels within a subframe, in accordance with certain aspects of the present description.

FIG. 2C is a diagram illustrating an example of a second frame, in accordance with certain aspects of the present description.

FIG. 2D is a diagram illustrating an example of uplink (UL) channels within a subframe, in accordance with certain aspects of the present description.

DETAILED DESCRIPTION

Figure 1:
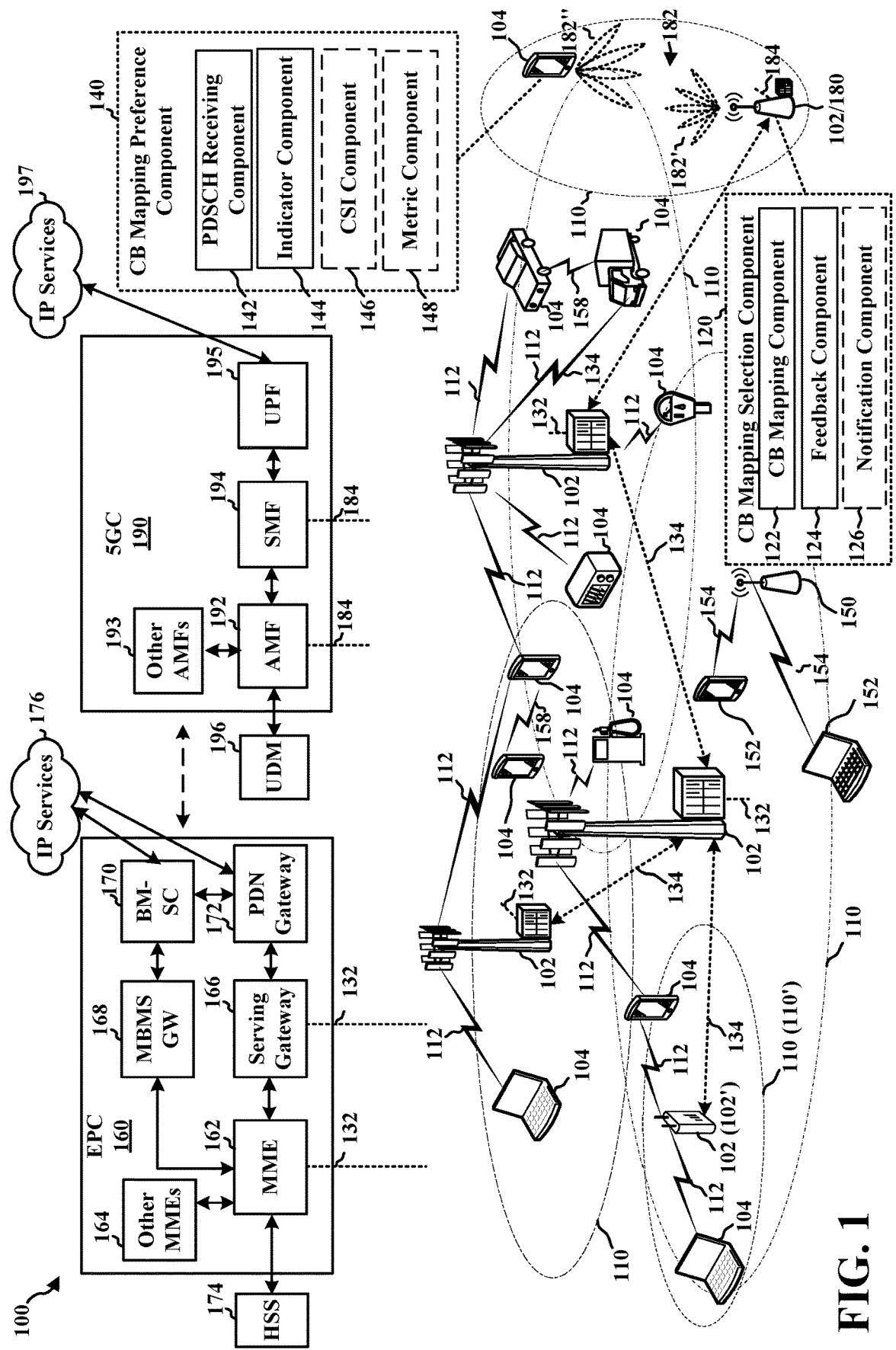
FIG. 1 is a diagram illustrating an example of a wireless communications system including an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Conventional 5G NR systems utilize a frequency first mapping of code blocks (CBs) to resource elements (REs). That is, bits of a CB may be sequentially allocated to REs in order of the RE index. Where a transmission includes multiple layers, the frequency first mapping allocates bits of the CB across the multiple layers at an RE index, then moves to the next RE index. Other mapping types for CB to RE mapping may perform better than a frequency first mapping in some scenarios. Other mapping types include a time first, frequency first per layer, and time first per layer, for example. For instance, a time first mapping may provide better performance than a frequency first mapping for high mobility scenarios (e.g., 120 kilometers per hour) with relatively high signal to noise ratio (SNR) (e.g., above 20 dB). As another example, frequency first per layer mapping may provide better performance than frequency first mapping in low mobility scenarios with high SNR. Dynamic selection of a mapping type may improve performance at a UE.

One issue with dynamic selection of mapping type is coordination between the base station and UE regarding the mapping type for a transmission. Conventionally, the base station makes decisions about UE scheduling and transmission properties based on feedback from the UE such as channel state information (CSI). For example, a UE may transmit a CSI report that includes a channel quality indicator (CQI) and rank indicator (RI) that are based on estimated decoding performance of the UE. The base station may then use the CQI and RI to schedule physical downlink shared channel (PDSCH) transmissions with a modulation and coding scheme (MCS) and rank that the UE is likely to be able to decode. The UE may determine CSI to report based on a current CB mapping type. Such a CSI report may not provide sufficient information for a base station to evaluate the effectiveness of different CB mapping types. A UE may have access to other information that is useful for identifying a CB mapping type, but there may be no reporting mechanism for providing the other information to the base station. Further, because a change in CB mapping type may occur relatively infrequently, it may be desirable to minimize overhead for feedback regarding CB mapping type.

In an aspect, the present disclosure provides techniques for a UE to indicate that a second dynamic CB mapping type is preferred over a first dynamic CB mapping type. The UE may determine a preferred mapping type based on one or more metrics. The UE may transmit an indicator of the second CB mapping type to the base station using light-weight signaling. For example, the indicator may be one or two bits dedicated to indicating a CB mapping preference that are included in uplink control information (UCI), either separately or in association with CSI. A two-bit indicator may identify a CB mapping type that is preferred by the UE. A one-bit indicator may indicate a request to change from a current CB mapping type. The base station may determine a new dynamic CB mapping type for the UE and indicate the new CB mapping type to the UE.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

One or more of the UEs 104 may include a CB mapping preference component 140 that provides an indicator that a second CB mapping type is preferred. The CB mapping preference component 140 may include a PDSCH receiving component 142 configured to receive a physical downlink shared channel (PDSCH) based on a first dynamic CB mapping type. The CB mapping preference component 140 may include an indicator component 144 configured to transmit an indicator of a second CB mapping type that is preferred by the UE based on a metric. In some implementations, the CB mapping preference component 140 may include a CSI component 146 configured to transmit a CSI report based on the second CB mapping type and/or the first CB mapping type. In some implementations, the CB mapping preference component 140 may include a metric component 148 configured to select the second CB mapping type based on a metric.

In an aspect, one or more of the base stations 102 may include a CB mapping selection component 120 that performs the actions of the base station as described herein (e.g., selecting a CB mapping type for the UE based on an indicator). For example, the CB mapping selection component 120 may include a CB mapping component 122 configured to transmit a PDSCH based on a first dynamic CB mapping type. The CB mapping selection component 120 may include a feedback component 124 configured to receive an indicator of a second CB mapping type that is preferred by a UE. The CB mapping selection component 120 may optionally include a notification component 126 configured to indicate a new dynamic CB mapping type to the UE.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D are resource diagrams illustrating example frame structures and channels that may be used for uplink, downlink, and sidelink transmissions to a UE 104 including a CB mapping preference component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
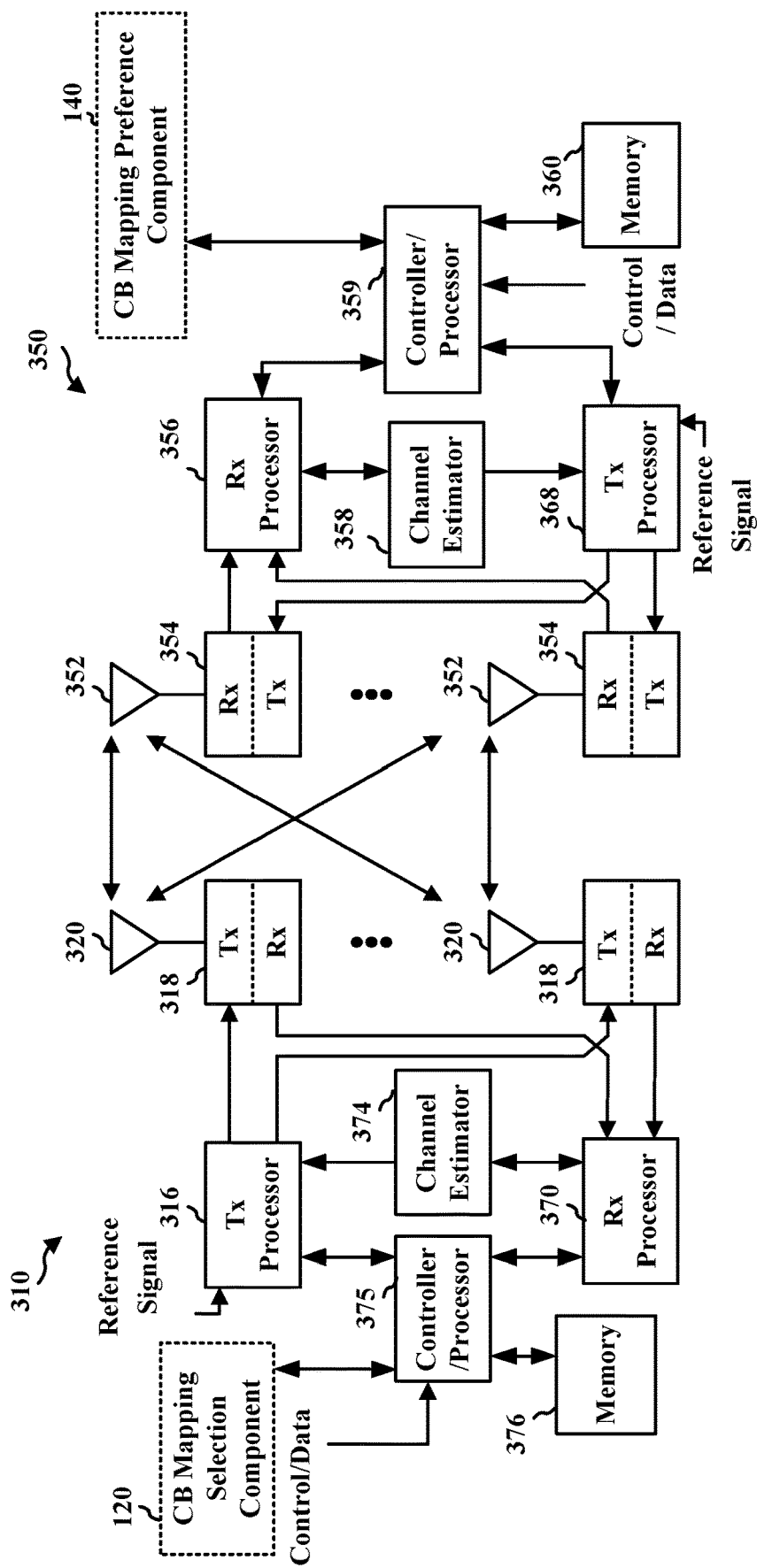
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the CB mapping preference component 140 of FIG. 1.

At least one of the Tx processor 316, the Rx processor 370, and the controller/processor 375 may be configured to perform aspects in connection with the CB mapping selection component 120 of FIG. 1.

Figure 4:
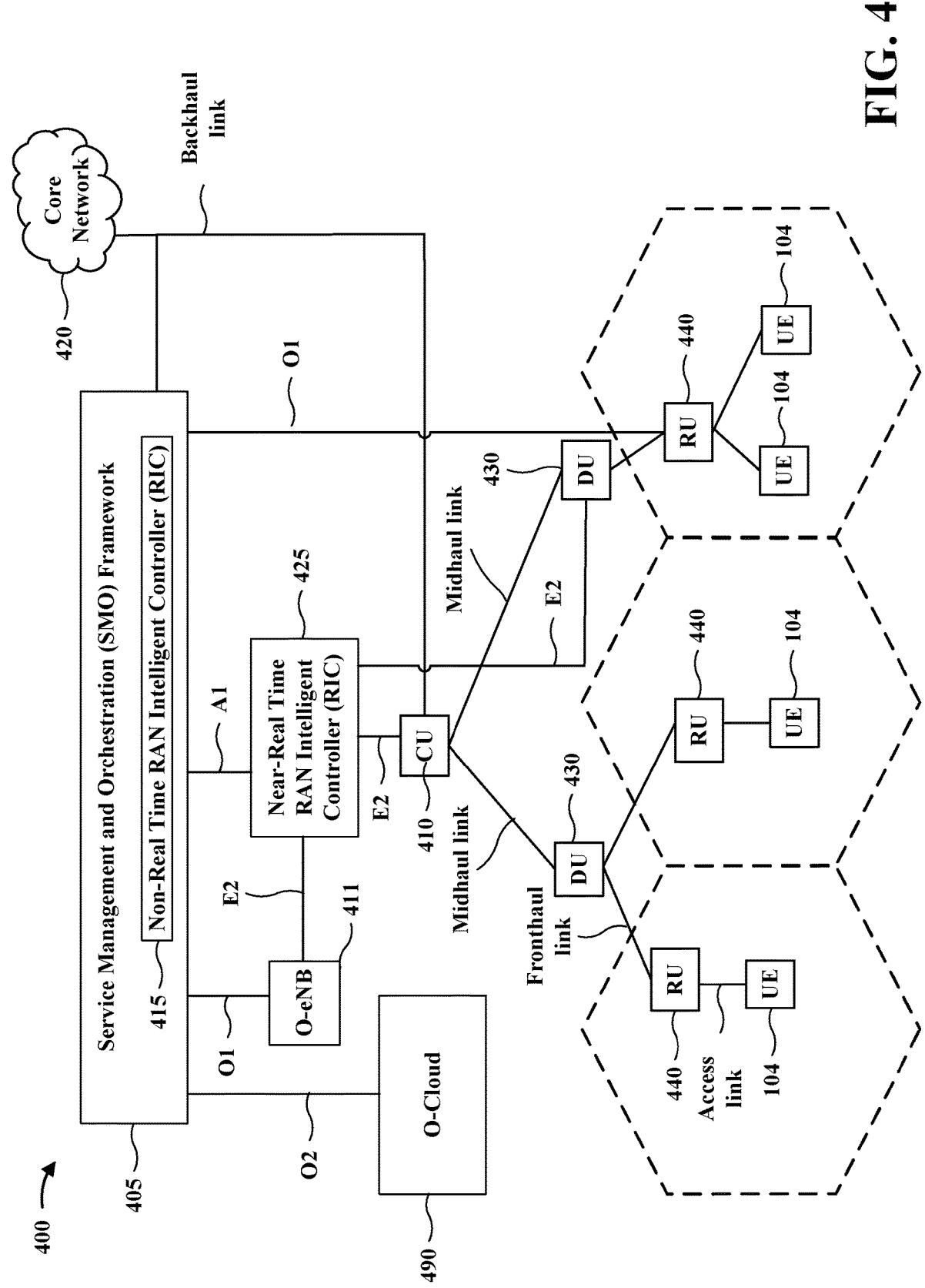
FIG. 4 shows a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
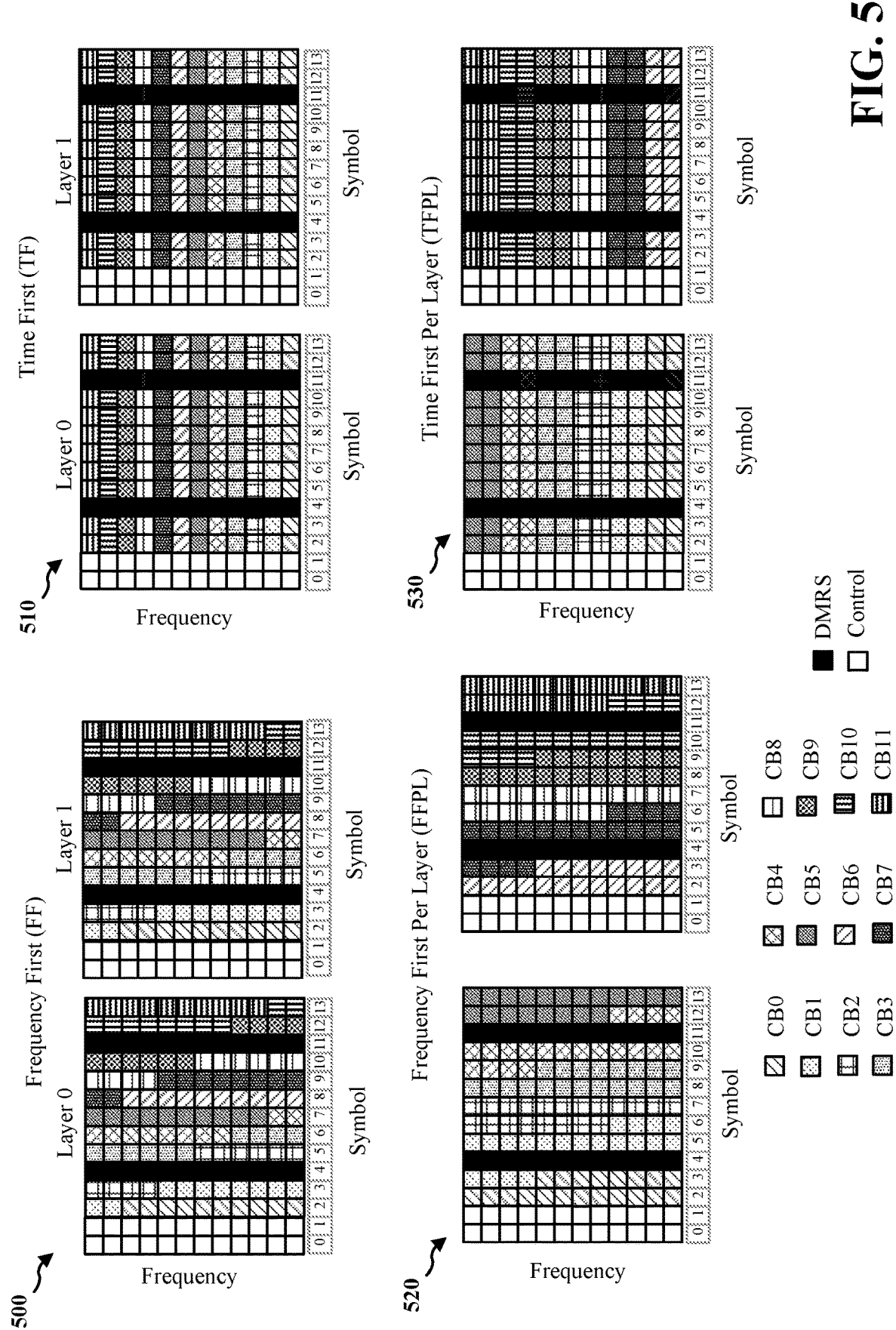
FIG. 5 is a diagram illustrating various code block (CB) to resource element (RE) mapping types.

FIG. 5 is a diagram illustrating various CB to RE mapping types. The examples are illustrated for two layers but may be extended to additional layers. A frequency first (FF) CB mapping type 500 maps the CBs across both layers in increasing frequency, then move to the next time-domain OFDM symbol. The time first (TF) CB mapping type 510 maps the CBs across available time-domain OFDM symbols first, then in increasing frequency. The frequency first per layer (FFPL) CB mapping type 520 maps the CBs in layer 0 in the frequency first order, then maps the CBs in layer 1. The time first per layer (TFPL) CB mapping type 530 maps the CBs in layer 0 in the time first order, then maps the CBs in layer 1.

As discussed above, the various CB to RE mapping types may provide better decoding performance in various scenarios. Generally, the performance differences may be due to different types of diversity provided by each mapping type. Time diversity may be enhanced or exploited when every CB is spanned across multiple OFDM symbols. Enhanced time diversity may be beneficial for scenarios with a relatively low time coherency of the channel (high Doppler spread) or in case that the channel estimation error is not equal for all the data OFDM symbols of the allocation. For example, channel estimation error may be significantly higher for the edge OFDM symbols of the allocation due to channel estimation extrapolation. Frequency diversity may be enhanced or exploited when CBs are spanning across multiple RBs. Enhanced frequency diversity may be beneficial for scenarios with a relatively low channel coherency bandwidth (mid/high delay spread). Spatial or layer diversity (relevant only for the case of MIMO with rank>1) is enhanced or exploited when every CB is spanned across multiple layers. Enhanced spatial or layer diversity is desired as the imbalance between layers increases. For example, FF CB mapping type 500 provides frequency and spatial diversity for each CB, while TF CB mapping type 510 provides time diversity and spatial diversity. The FFPL CB mapping type 520 and the TFPL mapping type 530 provide less spatial diversity but greater frequency and time diversity, respectively.

Figure 6:
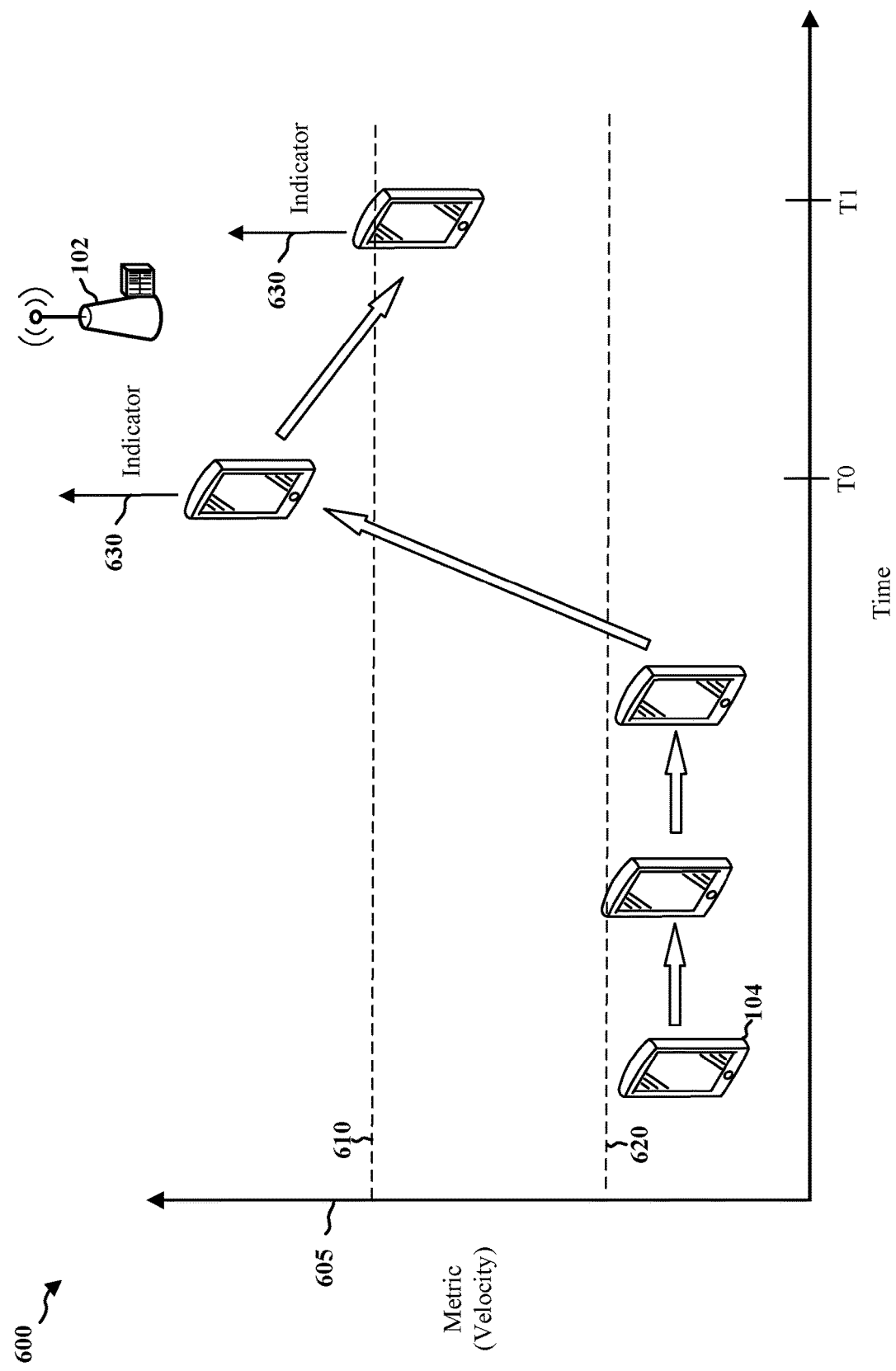
FIG. 6 is a diagram illustrating an example of a UE selecting a CB mapping preference based on a metric.

FIG. 6 is a diagram 600 illustrating a UE selecting a CB mapping preference based on a metric 605. For example, the metric 605 may be a velocity of the UE. The UE may measure a velocity, for example, using a global positioning system (GPS) receiver, an inertial measurement unit (IMU), or another sensor. As discussed above, different CB mapping types may perform better based on the velocity of the UE. For example, a time first or time first per layer CB mapping type may provide time diversity, which may be beneficial in high velocity scenarios with changing channel conditions.

In an implementation, a UE 104 may be configured with a first threshold 610 for determining that a second CB mapping type is preferred over the current CB mapping type and a second threshold 620 for determining that the current CB mapping type is preferred. In an example scenario, a UE may experience a significant change in velocity. For instance, the UE may experience a relatively low velocity while a user is stationary or walking. The UE may be configured with a current dynamic CB mapping type such as a frequency first CB mapping type. At a time T0, the user may board a vehicle and a velocity of the UE may increase. The UE may continuously or periodically evaluate the current CB mapping type against other CB mapping alternatives based on the metric (e.g., velocity). If the metric satisfies the first threshold 610, the UE 104 may transmit an indicator 630 that a second CB mapping type is preferred by the UE. In some implementations, the UE 104 may transmit the indicator 630 on multiple occasions until the current CB mapping type changes or a different CB mapping type is preferred.

As the metric 605 for the UE may be continuously changing, the metric 605 may not satisfy the first threshold 610 after the indicator 630 is transmitted but prior to a change in the CB mapping type. In some implementations, the second threshold 620 may be set to a different value such that the UE 104 does not change the CB mapping preference unless the metric 605 no longer satisfies the first threshold 610 and satisfies the second threshold 620. Accordingly, the use of different thresholds may provide a form of hysteresis to prevent frequent changes of UE CB mapping preference. In some implementations, other forms of hysteresis such as a threshold period of time for the metric 605 to satisfy the first threshold 610 may be used.

Although an example metric of velocity is illustrated, other metrics or combinations thereof may be used to determine a CB mapping preference of the UE 104. Example metrics include: channel state information reference signal (CSI-RS) measurements; tracking reference signal (TRS) measurements; channel correlation in time and frequency with received signal to noise ratio (SNR) measurements; estimation of decoding probability for each CB based on past allocations; deviations in decoding probability between different CBs of a transport block; differences in retransmissions per CB; differences in an average number of LDPC decoding iterations per CB; information regarding UE impairments; or CB grouping enablement status and number of code block groups. In some implementations, a machine-learning model may be trained to classify one or more metrics into a preferred CB mapping type. For example, the machine-learning model may be trained locally for the UE or by a machine-learning network element. For instance, the UE may collect training data including sets of any of the above UE metrics, current CB mapping type, and a performance metric such as throughput or CB decoding rate. The machine-learning model may receive the UE metrics as input and select a CB mapping type to optimize the predicted performance metric.

Figure 7:
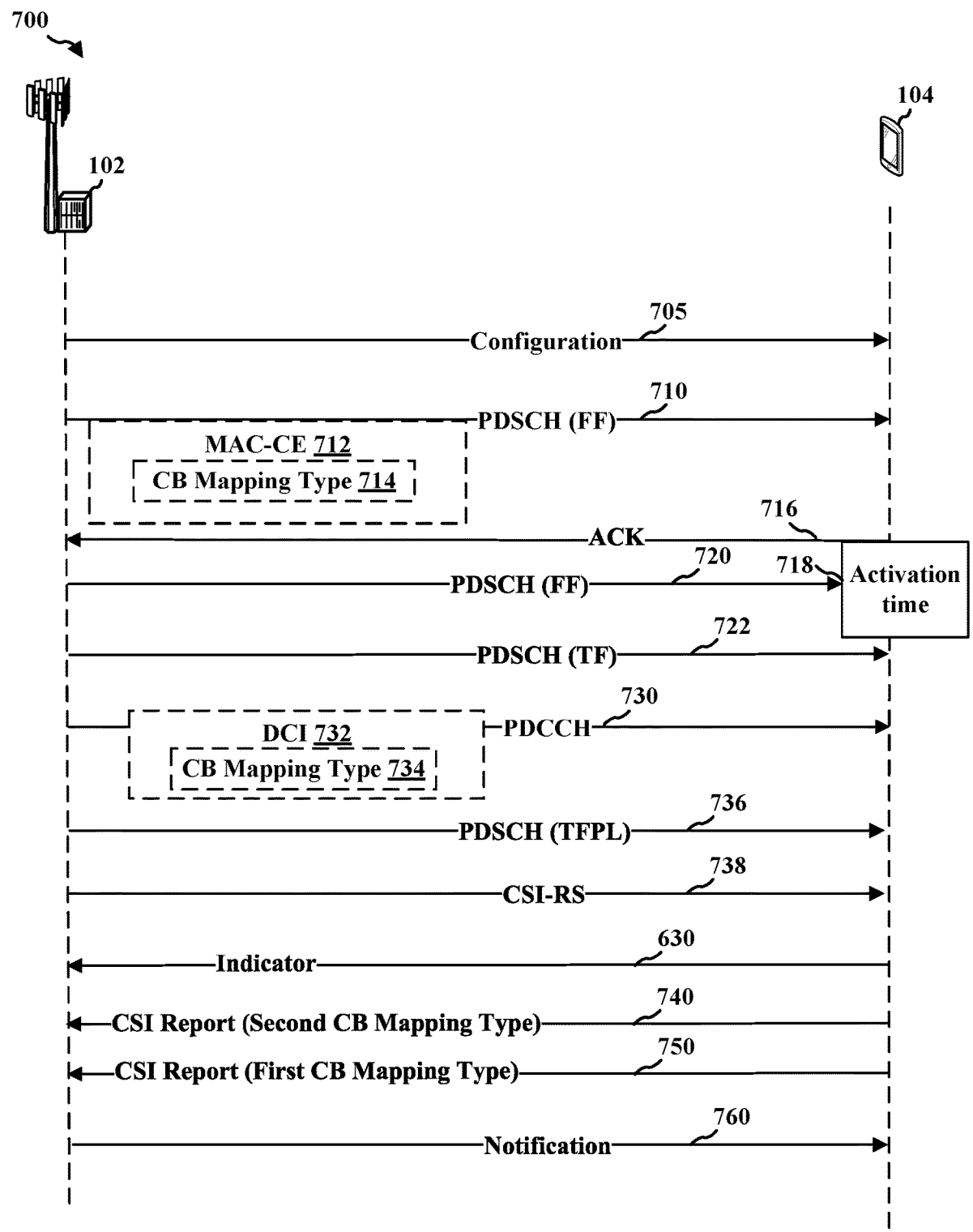
FIG. 7 is a message diagram illustrating example messages for dynamic CB mapping preference indication.

FIG. 7 is a message diagram 700 illustrating example messages for dynamic CB mapping indication. A base station 102 may transmit a configuration 705 that may configure a UE for dynamic CB mapping and/or CSI reporting. For example, the configuration 705 may be a radio resource control (RRC) message. The base station 102 may signal a current dynamic CB mapping type via a media access control (MAC) control element (CE) or via downlink control information (DCI). Generally, a notification of the current dynamic CB mapping type may be applicable until the current dynamic CB mapping type is changed by another MAC-CE. A DCI may indicate a dynamic CB mapping type to use for one or more transmissions scheduled by the DCI. The use of the DCI to signal CB mapping type may allow per allocation variations of the CB mapping type selected by the network.

The base station 102 may transmit a PDSCH 710 according to the active first CB mapping type. As illustrated, the active first CB mapping type may initially be the FF CB mapping type 500. The base station 102 may change the active CB mapping type by transmitting a MAC-CE 712 indicating a second CB mapping type 714. The MAC-CE 712 may be attached to a PDSCH (e.g., PDSCH 710). A MAC-CE configuration may have a predefined rule for an activation time 718 which defines a time/slot after the UL slot on which the ACK 716 for the MAC-CE reconfiguration command (e.g., MAC-CE 712 received over PDSCH 710) was transmitted. The UE 104 can assume the CB mapping type has changed after the activation time 718. This activation time 718 is usually set to the 4th slot after the ACK 716.

Accordingly, the UE 104 may receive a PDSCH 720 according to the first CB mapping type prior to the second CB mapping type 714 becoming active. A PDSCH 722 received after the activation time 718 may use the second CB mapping type 714.

When DCI based signaling is used, the base station 102 may transmit a PDCCH 730 including a DCI 732. The DCI 732 may schedule a PDSCH 736 for the UE. The DCI 732 may also indicate a CB mapping type 734 for the PDSCH 736. The use of the DCI 732 to signal CB mapping type may allow per allocation variations of the CB mapping type selected by the network. For example, the base station may transmit one or more additional PDCCHs including a DCI with a different CB mapping type. Accordingly, the PDSCH 736 may follow a different CB mapping type than the PDSCH 722.

The UE 104 may transmit the indicator 630. For example, the indicator 630 may be transmitted as uplink control information (UCI), which may be transmitted on a PUCCH or PUSCH. The indicator 630 may indicate that a second CB mapping type is preferred by the UE 104 based on the metric 605. For example, in some implementations, the indicator 630 may be a two-bit indicator that indicates one of up to four configured CB mapping types. For instance, the UE may be configured by the configuration 705 with up to four CB mapping types such as FF CB mapping type 500, TF CB mapping type 510, FFPL CB mapping type 520, and/or TFPL CB mapping type 530. The two-bit indicator may correspond to an index of a configured mapping type. In some other implementations, a one-bit indicator may indicate a request to change from the current CB mapping type.

In some implementations, the indicator 630 may be signaled (or reported) coupled to a CSI report 740. For example, the indicator 630 may be an additional component in UCI including a CSI report or may be a part of a new extended CSI report format that includes an additional one-bit or two-bit field dedicated to the indicator 630. The CSI report may be a periodic CSI report, a semi-persistent CSI report, or an aperiodic CSI report. In some implementations, a one-bit or two-bit indicator 630 coupled with the periodic CSI report or semi-persistent CSI report to provide information with low overhead. In some implementations, the CSI report 740 may be based on the preferred second CB mapping type. That is, the channel quality indicator (CQI) and rank indicator (RI) of the CSI report 740 may be calculated based on the second CB mapping type rather than the current CB mapping type. In some implementations, the UE may also transmit a CSI report 750 based on the current CB mapping type.

In some implementations, the indicator 630 may be signaled in UCI and not coupled to any CSI report. For example, the indicator 630 may be transmitted in a UCI including HARQ ACK/NAK. For instance, in cases where the metric 605 is based on decoding probability or retransmission rate, the indicator 630 may not be coupled with a CSI report.

In response to the indicator 630 from the UE, the network (e.g., base station 102) may select a new DL CB mapping type for the UE 104 based at least in part on the indicator 630. The network may consider additional information such as: a scheduling scenario, CSI based on a CSI report or SRS, operational MCS and RI, channel delay spread, Doppler spread, SNR measurements, and/or UE speed. Some of these considerations may involve additional information provided by the UE 104. The base station 102 may transmit a notification 760 of a new dynamic CB mapping type. For example, the base station 102 may utilize either MAC-CE signaling or DCI-based signaling for the new dynamic CB mapping type.

Figure 8:
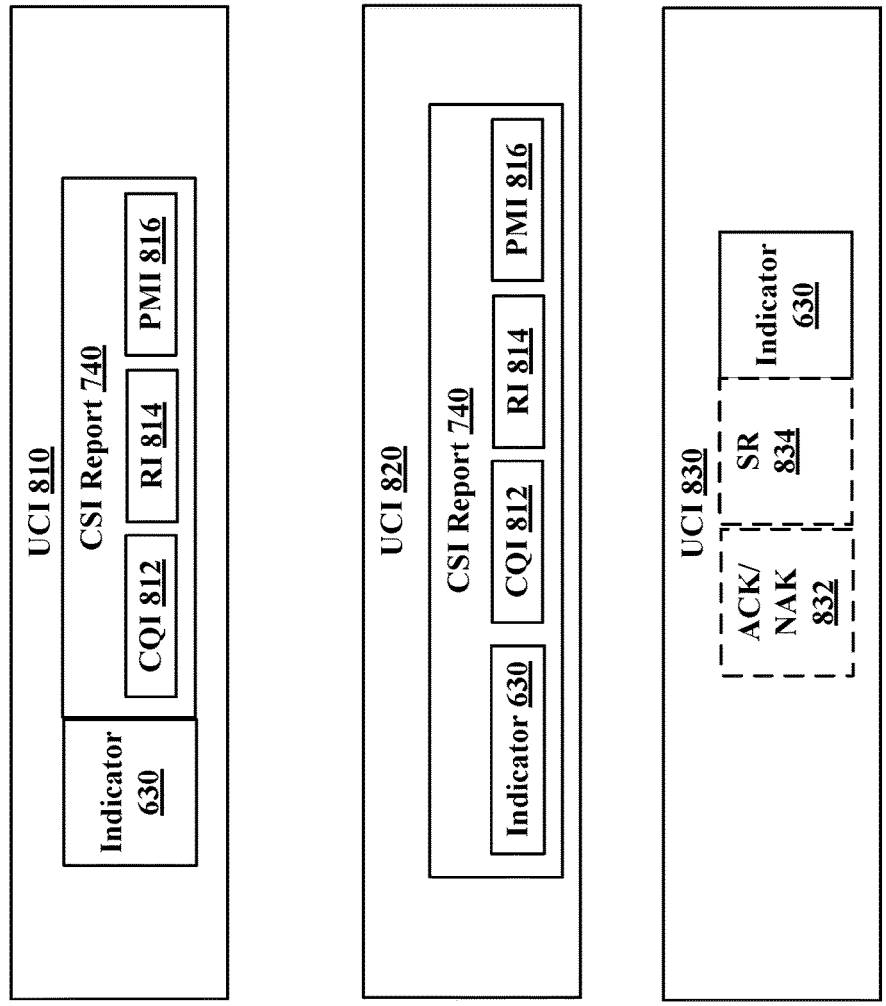
FIG. 8 is a diagram of example uplink control information (UCI) formats for a dynamic CB mapping preference indicator.

FIG. 8 is a diagram 800 of example UCI formats for the indicator 630. In a first example, a UCI 810 includes the indicator 630 as a separate field that is coupled to a conventional CSI report 740 including a CQI 812, a RI 814, and a PMI 816. In a second example, a UCI 820 includes a CSI report 740 having a new format including the indicator 630, the CQI 812, the RI 814, and the PMI 816. In a third example, a UCI 830 includes the indicator 630 as a separate field that may optionally be coupled to a HARQ ACK/NAK 832 or scheduling request (SR) 834.

In the case of a one-bit indication that the second CB mapping type is preferred over the current CB mapping type, the UE and base station may be configured with rules to determine the current CB mapping type. Given the assumed dynamic indication and reconfiguration of CB mapping type for some time period (MAC-CE based) or per allocation (DCI based), the UE and the network should be aligned on the assumption/determination of the current CB mapping type for correct interpretation of the indicator 630 and similarly for interpretation of CSI reports 740, 750 provided by the UE in general.

In the case that the indicator 630 is coupled to or as a part of a CSI report 740 (e.g., in UCI 810 or UCI 820), the current CB mapping type for the indicator 630 may be the same as the CB mapping type used as the reference for the CSI report. For example, the UE may rely on CSI reference resource assumptions which will include the CB mapping type assumption. In case that the indicator 630 is not coupled to a CSI report, similar rules can determine the current CB mapping type assumption but without any relation to CSI-RS or CSI reference resource.

For DCI based CB mapping signaling, per allocation variations of the CB mapping type selected by the network may be likely. Per allocation variation allows the network to accommodate some dependencies of CB mapping type selection on allocation size and scheduling scenario. In the case that the one-bit indicator 630 is transmitted per allocation (for example coupled to ACK/NAK 832 of the last transmission as in UCI 830), the current CB mapping type may be the CB mapping type that was signaled for the addressed allocation. In cases where the indicator 630 is provided in a periodic manner but not coupled to a CSI report, then a dynamic assumption for the current CB mapping type may be based on a history of the CB mapping type during a recent period of time to capture a representative CB mapping type per report.

Figure 9:
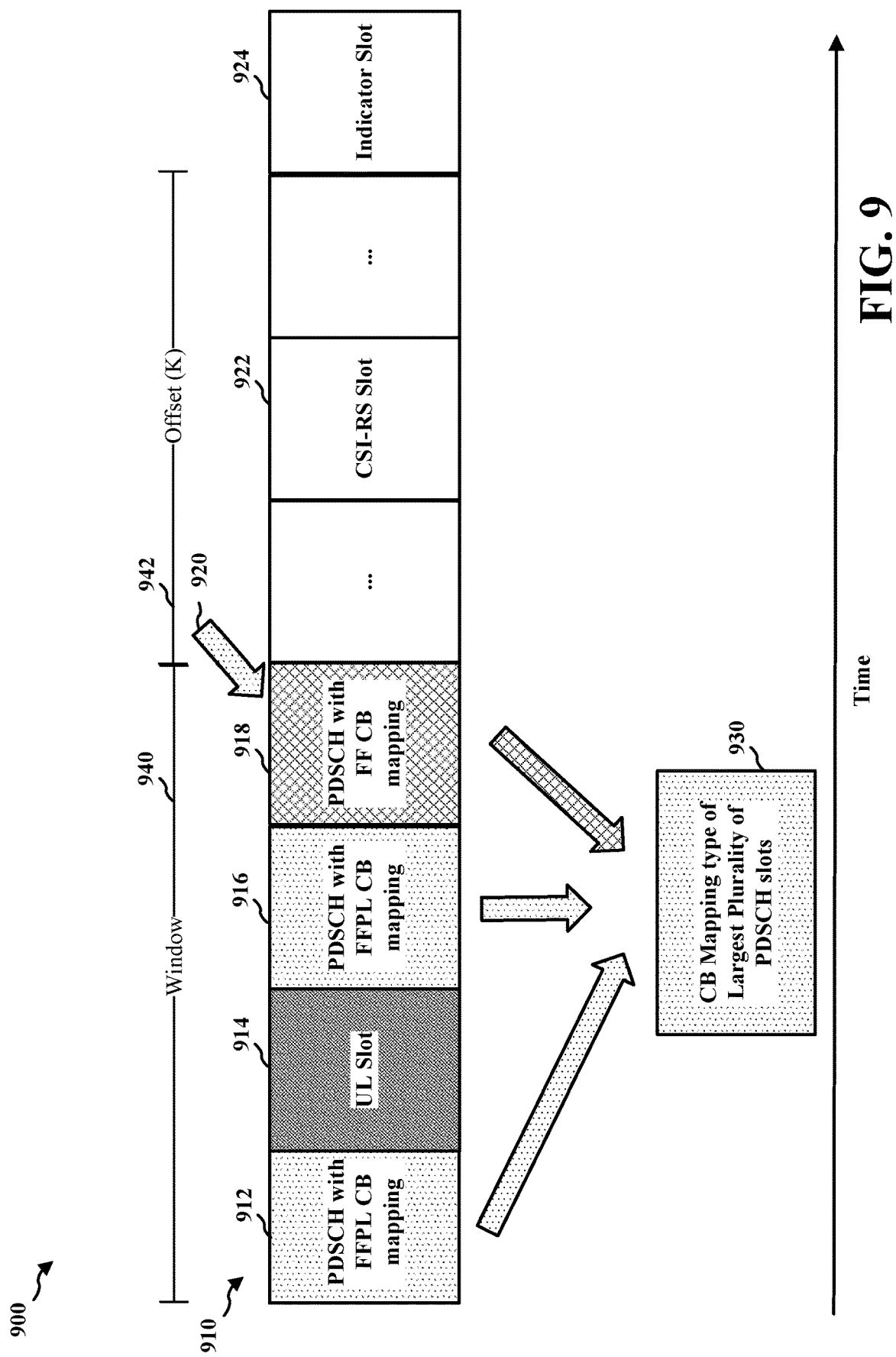
FIG. 9 illustrates an example of determining a current CB mapping type for the dynamic CB mapping preference indicator when a CB mapping type is indicated by downlink control information (DCI).

FIG. 9 illustrates an example 900 of determining a current CB mapping type for an indicator 630 when a CB mapping type for PDSCH is indicated by DCI. A DCI 732 may schedule each slot 910 separately. For example, slots 912, 916, and 918 may be scheduled for PDSCH and slot 914 may be an uplink slot. The DCI 732 may specify a CB mapping type for each PDSCH. For example, slots 912 and 916 may be scheduled with the FFPL CB mapping type 520, and slot 918 may be scheduled with the FF CB mapping type 500. Additionally, a rule may define an assumption the UE 104 may make regarding the current CB mapping type. In some implementations, according to a first rule for DCI-based CB mapping indication, the UE 104 may assume a CB mapping type for the indicator 630 based on a voting approach where a CB mapping type that was used for the UE for a largest plurality 930 of PDSCH slots for a time window 940 before the indicator 630 is used as the current CB mapping type for the indicator 630.

In implementations where the indicator 630 is not coupled with a CSI report, the window 940 may be determined based on an offset (K) 942 from a slot 924 where the indicator 630 is transmitted. The value of K 942 may be defined in a standards document or regulation, or configured via system information or RRC signaling, for example. The CB mapping type that was used for the UE for a largest plurality 930 of PDSCH slots for the window 940 is used as the current CB mapping type. For example, as illustrated in FIG. 9, the time window 940 may be 4 slots ending K slots before the indicator slot 924. In this example, two of the slots used the FFPL CB mapping type 520 and one slot used the FF CB mapping type 500, so the UE 104 may assume the FFPL CB mapping type 520 for determining whether a second CB mapping type is preferred. Conversely, the base station 102 may determine the current CB mapping type assumed by the UE 104 in order to interpret the indicator 630 based on the current CB mapping type. That is, the base station 102 may determine the same current CB mapping type based on the largest plurality 930 of PDSCH slots for the window 940.

In implementations where the indicator 630 is coupled with a CSI report, a CSI configuration may define a CSI-RS slot 922 and a CSI reporting slot, which may be the same as the indicator slot 924. A CSI reference resource slot 920 may be defined based on the CSI-RS slot 922 and the CSI reporting/indicator slot 924. The UE 104 may make the following assumptions about the CSI reference resource slot 920: The first 2 OFDM symbols are occupied by control signaling; the number of PDSCH and DM-RS symbols is equal to 12; the same bandwidth part subcarrier spacing configured as for the PDSCH reception; the bandwidth as configured for the corresponding CQI report; the reference resource uses the CP length and subcarrier spacing configured for PDSCH reception; no resource elements used by primary or secondary synchronization signals or PBCH; The redundancy version is 0; the ratio of PDSCH EPRE to CSI-RS EPRE is as given in Subclause 4.1; no REs are allocated for NZP CSI-RS and ZP CSI-RS; the same number of front loaded DM-RS symbols as the maximum front-loaded symbols configured by the higher layer parameter maxLength in DMRS-DownlinkConfig; the number of additional DM-RS symbols is the same as the additional symbols configured by the higher layer parameter dmrs-AdditionalPosition; the PDSCH symbols do not contain DM-RS; and the PRB bundling size is 2 PRBs.

Additionally, a rule may define an assumption the UE 104 may make regarding the current CB mapping type for CSI evaluation. In some implementations, according to a first rule for DCI-based CB mapping indication, the UE 104 may assume a CB mapping type for a CSI report based on a voting approach where a CB mapping type that was used for the UE for a largest plurality 930 of PDSCH slots for the time window 940 up to and including the CSI reference resource slot 920 is used as the assumption for CSF evaluation. That is the time window 940 may be defined based on the CSI reference resource slot 920. For example, as illustrated in FIG. 9, the time window 940 may be 4 slots before and including the CSI reference resource slot 920. In this example, two of the slots used the FFPL CB mapping type 520 and one slot used the FF CB mapping type 500, so the UE 104 may assume the FFPL CB mapping type 520 for CSI evaluation (e.g., calculating CQI and RI) and for the indicator 630. The indicator 630 may be coupled with the CSI report.

Figure 10:
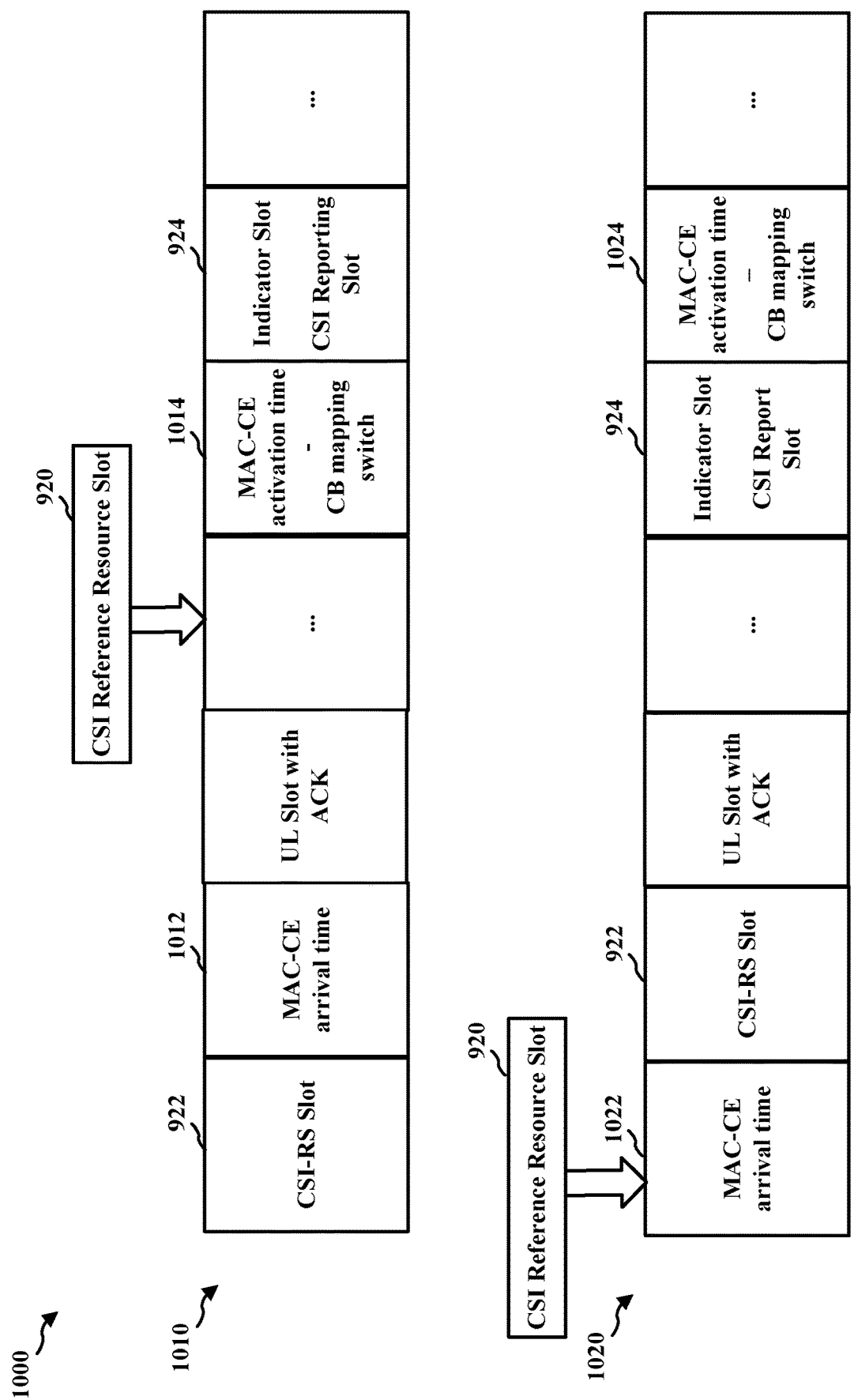
FIG. 10 is a diagram of example scenarios of determining a current CB mapping type for the dynamic CB mapping preference indicator where the active CB mapping type changes based on media access control (MAC) control element (CE) signaling.

FIG. 10 is a diagram 1000 of example scenarios where the active CB mapping type changes based on MAC-CE signaling. Although the current dynamic CB mapping type can generally be easily determined for CSF evaluation and/or indicator 630 based on the active CB mapping type, there are several scenarios where the current CB mapping type may be defined by a rule. In a first scenario 1010, the CSI-RS slot 922 may occur before the MAC-CE 712 arrives in a slot 1012. The indicator slot 924 may be after the activation time 718 in a slot 1014. Accordingly, the active CB mapping type may change between the CSI-RS slot 922 and the indicator slot 924. In a second scenario 1020, the MAC-CE 712 may arrive in slot 1022 before the CSI-RS slot 922, and the indicator slot 924 may occur before the MAC-CE activation time in slot 1024. Accordingly, the CSI reporting and/or indicator 630 may occur after the new active CB mapping type is indicated, but before the new active CB mapping type is activated.

In cases where the indicator 630 is transmitted independently of a CSI report, the current CB mapping type may be the active CB mapping type of the indicator slot 924. That is, the indicator slot 924 may be compared with the MAC-CE activation time in slot 1014 to determine the current CB mapping type for the indicator 630. For instance, in the first scenario 1010, the indicator slot 924 may be acter the MAC-CE activation time in slot 1014, so the current CB mapping type may be the CB mapping type indicated by the MAC-CE. As another example, in the scenario 1020, the indicator slot 924 may be before the MAC-CE activation time in slot 1024, so the current CB mapping type may be the CB mapping type prior to the MAC-CE. When the indicator 630 is coupled with a CSI report, the current CB mapping type for the indicator 630 may be the same as the current CB mapping type for the CSI report.

Figure 11:
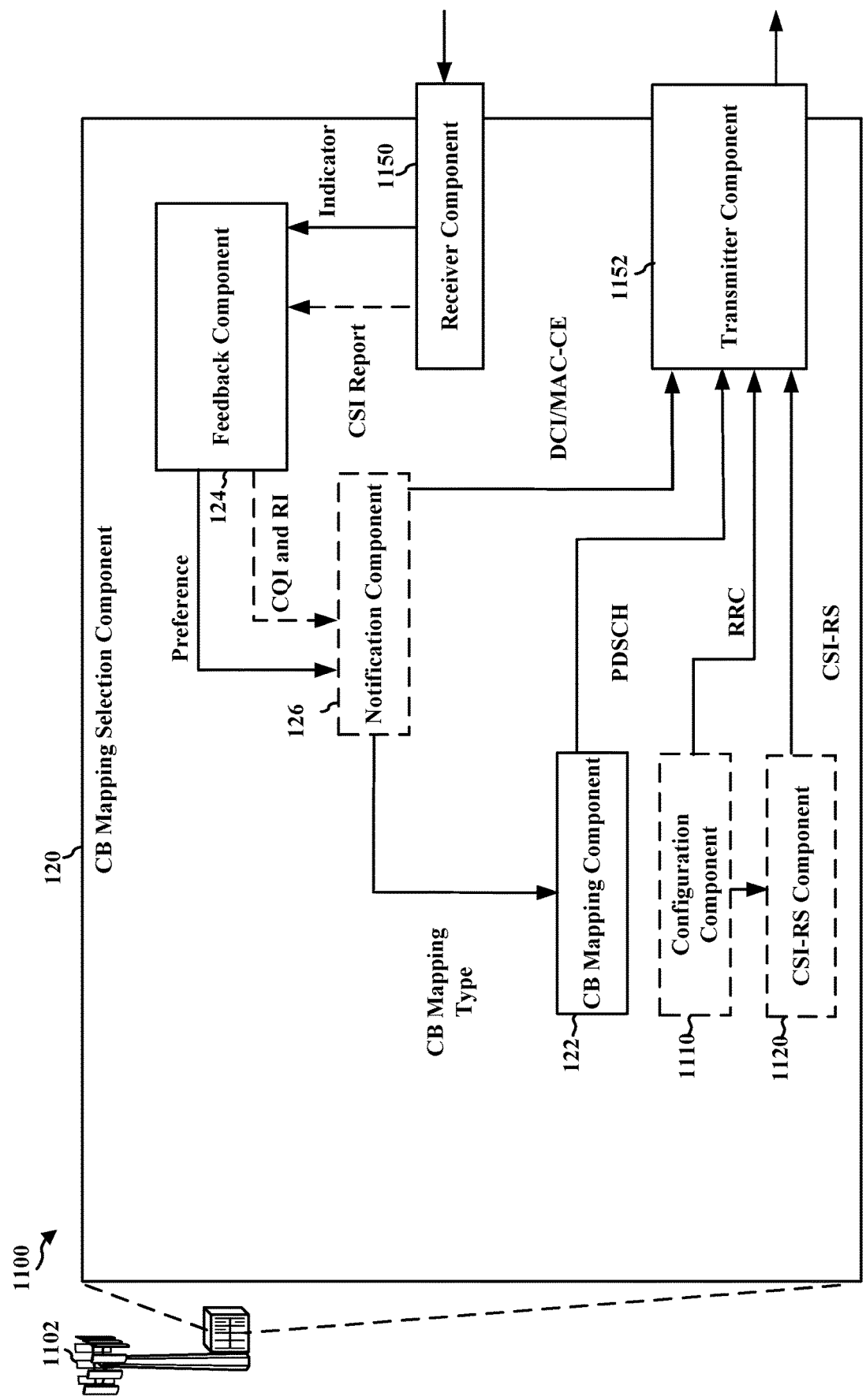
FIG. 11 is a conceptual data flow diagram illustrating the data flow between different means/components in an example base station.

FIG. 11 is a conceptual data flow diagram 1100 illustrating the data flow between different means/components in an example base station 1102, which may be an example of the base station 102 including the CB mapping selection component 120. The CB mapping selection component 120 may include the CB mapping component 122, the feedback component 124. The CB mapping selection component 120 may optionally include a notification component 126, a configuration component 1110, or a CSI-RS component 1120.

The base station 1102 may also include a receiver component 1150 and a transmitter component 1152. The receiver component 1150 may include, for example, a RF receiver for receiving the signals described herein. The transmitter component 1152 may include for example, an RF transmitter for transmitting the signals described herein. In some implementations, the receiver component 1150 and the transmitter component 1152 may be co-located in a transceiver such as the Tx/Rx 318 in FIG. 3.

The receiver component 1150 may receive uplink signals from UEs 104. For example, the receiver component 1150 may receive the indicator 630, an ACK 716, a CSI report 740 or CSI report 750. The receiver component 1150 may provide the indicator 630, the ACK 716, the CSI report 740 or the CSI report 750 to the feedback component 124.

The CB mapping component 122 may be configured to transmit a PDSCH based on a first dynamic CB mapping type in one or more slots. The CB mapping component 122 may receive the CBs for the PDSCH from higher layers (e.g., an encoder). In some implementations, the CB mapping component 122 may receive an indication of the first CB mapping type from the notification component 126. The CB mapping component 122 may map the CBs to REs according to the first CB mapping type, for example, as illustrated in FIG. 4. The CB mapping component 122 may transmit the PDSCH via the transmitter component 1152.

In some implementations, the CSI-RS component 1120 may be configured to transmit a CSI-RS. In some implementations, the CSI-RS component 1120 may transmit the CSI-RS 738 according to the configuration 705. For instance, the CSI-RS component 1120 may transmit the CSI-RS 738 in the CSI-RS slot 922. In some implementations, the CSI-RS component 1120 may receive the configuration 705 or the CSI-RS slot 922 from the configuration component 1110.

The feedback component 124 may be configured to receive the indicator 630 that a second CB mapping type is preferred by the UE via the receiver component 1150. The feedback component 124 may interpret the indicator 630 to determine a preference of the UE for the second CB mapping type. In some implementations, the feedback component 124 may receive a CSI report 740 including a CQI and RI based on a CSI-RS assuming a second dynamic CB mapping type. The second dynamic CB mapping type may be the second dynamic CB mapping type that is preferred by the UE. In some implementations, the feedback component 124 may also receive the CSI report 750 including a CQI and RI based on a CSI-RS assuming the current dynamic CB mapping type, which may not be preferred by the UE. The feedback component 124 may decode the CSI report 740, 750 to determine the CQI and the RI. In some implementations, the feedback component 124 may provide the CQI and the RI to the notification component 126.

The notification component 126 may be configured to select a CB mapping type and indicate a new dynamic CB mapping type to the UE. The notification component 126 may determine the CB mapping type based on the indicator 630 or preference of the UE. In some implementations, the notification component 126 may determine the CB mapping type based on the indicator and one or more of a scheduling scenario, the CSI, downlink operational modulation and coding scheme (MCS) and rank indicator (RI), channel delay spread, Doppler spread measurements, signal to noise ratio (SNR) measurements, reported UE speed, or reported UE Doppler measurements. The notification component 126 may transmit a notification indicating the new dynamic CB mapping type via the transmitter component 1152 as either a DCI 732 or a MAC-CE 712. The notification component 126 may receive the ACK 716 via the receiver component 1150 indicating that the MAC-CE was correctly received and that the indicated mapping type will be activated after the activation time. The notification component 126 may also provide an indication of the new dynamic CB mapping type to the CB mapping component 122.

The configuration component 1110 may be configured to configure dynamic CB mapping and/or CSI reporting for a UE. For example, the configuration component 1110 may transmit the configuration 705 to the UE via the transmitter component 1152. For instance, the configuration 705 may configure CB mapping types available for the UE and parameters for the indicator 630. In some implementations, the configuration component 1110 may configure the second dynamic CB mapping type for an identifier of a CSI report (e.g., a CSI report ID). For example, the configuration component 1110 may transmit an RRC message, MAC-CE, or DCI to update the second dynamic CB mapping type for CSI reporting based on a type of scheduling of the CSI report corresponding to the CSI report ID 512.

Figure 12:
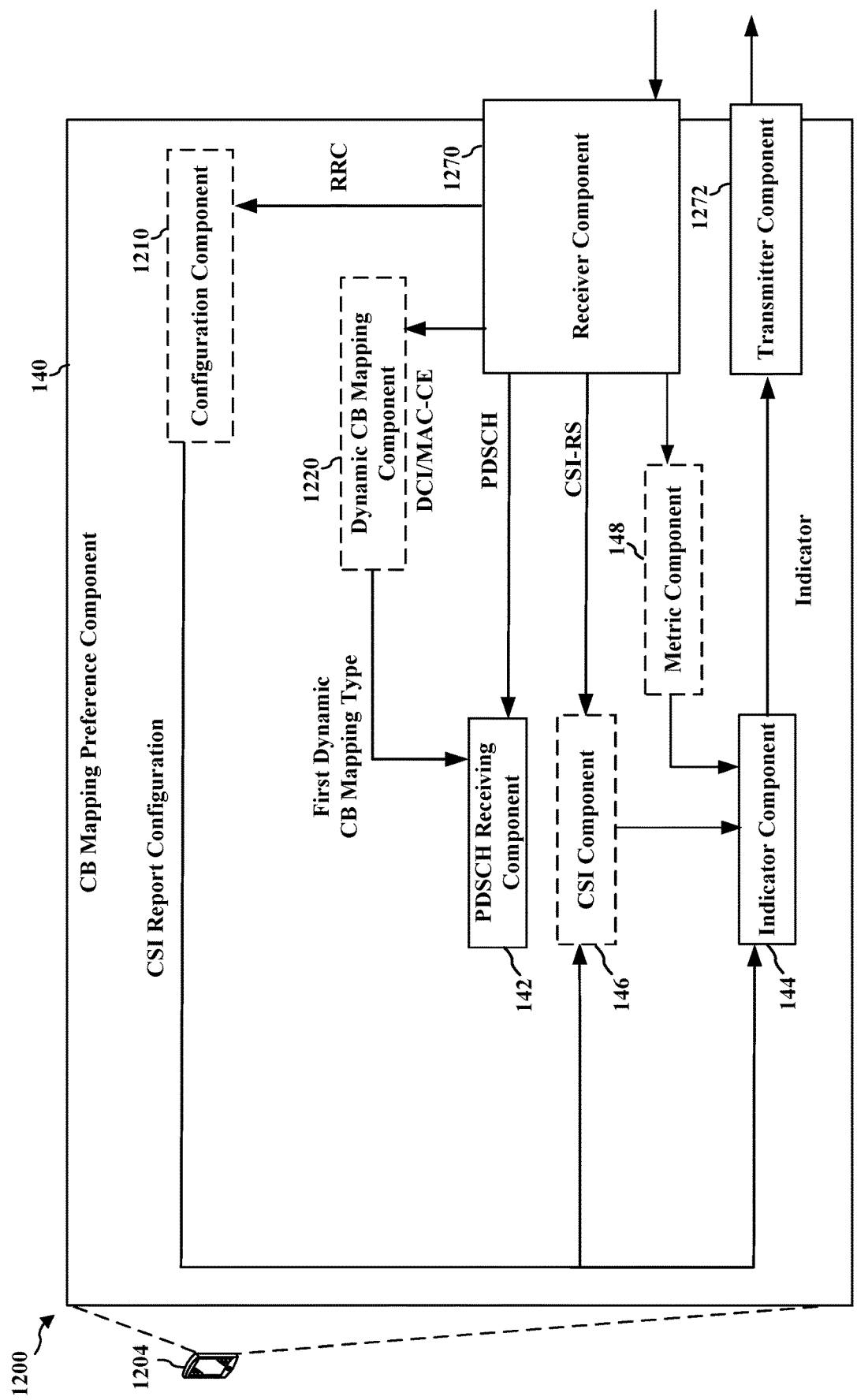
FIG. 12 is a conceptual data flow diagram illustrating the data flow between different means/components in an example UE.

FIG. 12 is a conceptual data flow diagram 1200 illustrating the data flow between different means/components in an example UE 1204, which may be an example of the UE 104 and include the CB mapping preference component 140. As discussed with respect to FIG. 1, the CB mapping preference component 140 may include the PDSCH receiving component 142 and the indicator component 144. The CB mapping preference component 140 may optionally include the CSI component 146 and/or the metric component 148. The CB mapping preference component 140 may optionally include a configuration component 1210 and/or a dynamic CB mapping component 1220. The UE 104 also may include a receiver component 1270 and a transmitter component 1272. The receiver component 1270 may include, for example, a RF receiver for receiving the signals described herein. The transmitter component 1272 may include for example, an RF transmitter for transmitting the signals described herein. In some implementations, the receiver component 1270 and the transmitter component 1272 may be co-located in a transceiver such as the Tx/Rx 354 in FIG. 3.

The receiver component 1270 may receive downlink signals such as the CSI configuration the MAC-CE 712, the DCI 732, and the PDSCH 710, 720, 722. The receiver component 1270 may provide the CSI configuration and/or the MAC-CE 712 to the configuration component 1210. The receiver component 1270 may provide the MAC-CE 712 and/or the DCI 732 to the dynamic CB mapping component 1220. The receiver component 1270 may provide the PDSCH 710, 720, 722 to the PDSCH receiving component 142.

The PDSCH receiving component 142 may be configured to receive a PDSCH based on a first dynamic CB mapping type in one or more slots based on a first dynamic CB mapping type. For example, the PDSCH receiving component 142 may receive the PDSCH 710, 720, 722 via the receiver component 1270. The PDSCH receiving component 142 may decode a received PDSCH based on the first dynamic CB mapping type, which may be indicated by the dynamic CB mapping component 1220. The PDSCH receiving component 142 may demap the REs of the PDSCH to the CBs, then decode each CB separately.

In some implementations, the CSI component 146 may be configured to calculate CSI based on a CSI-RS assuming a second dynamic CB mapping type. The CSI component 146 may receive the CSI-RS via the receiver component 1270. The CSI component 146 may determine a timing of the CSI-RS and a CSI report 740, 750 based on a CSI configuration indicated by the configuration component 1210. The CSI component 146 may determine the current CB mapping type according to a rule based on a configured type of dynamic CB mapping indication (e.g., either DCI-based or MAC-CE based). The CSI component 144 may provide the CSI to the indicator component 144.

In some implementations, the metric component 148 may be configured to determine a metric related to CB mapping type preference for the UE. For example, the metric component 148 may receive one or measurements via receiver component 1270 or a separate sensor. For instance, the metric may be based on one or more of: CSI-RS measurements; TRS measurements; channel correlation in time and frequency with received SNR measurements; estimation of decoding probability for each CB based on past allocations; deviations in decoding probability between different CBs of a transport block; differences in retransmissions per CB; differences in an average number of LDPC decoding iterations per CB; information regarding UE impairments; or CB grouping enablement status and number of code block groups.

The indicator component 144 may be configured to transmit an indicator 630 of a second CB mapping type that is preferred by the UE based on a metric. The indicator component 144 may receive the metric from the metric component 148. In some implementations, the indicator component 144 may comparing the metric to a first threshold to determine that the first dynamic CB mapping type is not preferred by the UE. The indicator component 144 may determine that the first dynamic CB mapping type is preferred by the UE in response to the metric satisfying a second threshold. In some implementations, the indicator component 144 may transmit the indicator 630 coupled with a CSI report 740. The indicator component 144 may receive the CSI (e.g., CQI and RI based on the second CB mapping type from the CSI component 146.

The configuration component 1210 may be configured to receive a configuration 705. For example, the configuration component 1210 may receive the configuration 705 as an RRC message via the receiver component 1270. The configuration component 1210 may decode the configuration 705 to determine the CSI-RS slot 922 and/or the the CSI reporting/indicator slot 924. The configuration component 1210 may provide the CSI-RS slot 922 to the CSI component 146. The configuration component 1210 may provide the indicator slot 924 to the indicator component 144.

The dynamic CB mapping component 1220 may be configured to determine the first dynamic CB mapping type. The dynamic CB mapping component 1220 may the receive DCI 732 or the MAC-CE 712 via the receiver component 1270. The DCI 732 may indicate a dynamic CB mapping type for a specific slot or PDSCH. The dynamic CB mapping component 1220 may determine a slot when a new dynamic CB mapping type becomes active based on the activation time 718. The dynamic CB mapping component 1220 may provide the first dynamic CB mapping type for each slot or PDSCH to the PDSCH receiving component 142.

Figure 13:
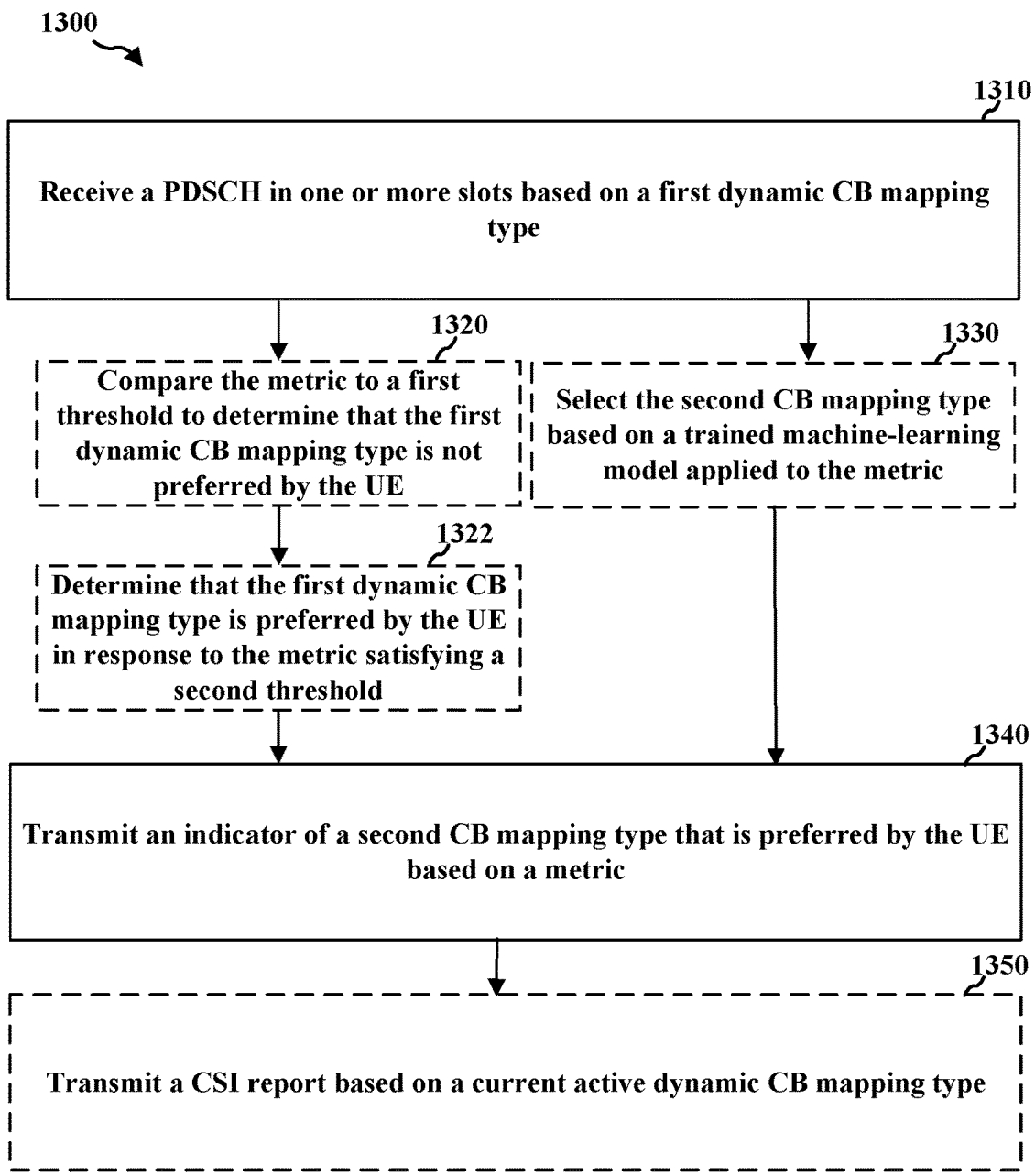
FIG. 13 is a flowchart of an example method for a UE to indicate a preference for a dynamic CB mapping type.

FIG. 13 is a flowchart of an example method 1300 for a UE to indicate a preference for a dynamic CB mapping type. The method 1300 may be performed by a UE (such as the UE 104, which may include the memory 360 and which may be the entire UE 104 or a component of the UE 104 such as the CB mapping preference component 140, Tx processor 368, the Rx processor 356, or the controller/processor 359). The method 1300 may be performed by the CB mapping preference component 140 in communication with the CB mapping selection component 120 of the base station 102. Optional blocks are shown with dashed lines.

At block 1310, the method 1300 includes receiving a PDSCH based on a first dynamic CB mapping type. In some implementations, for example, the UE 104, the Rx processor 356, or the controller/processor 359 may execute the CB mapping preference component 140 or the PDSCH receiving component 142 to receive a PDSCH 710, 720, 722 based on a first dynamic CB mapping type. The first dynamic CB mapping type may be a dynamic CB mapping type for each of one or more slots or an active dynamic CB mapping type. In some implementations, the first dynamic CB mapping type (e.g., CB mapping type 714) is indicated by a MAC-CE 712. In some implementations, the first dynamic CB mapping type is indicated by a DCI 732. Accordingly, the UE 104, the Rx processor 356, or the controller/processor 359 executing the CB mapping preference component 140 or the PDSCH receiving component 142 may provide means for receiving a PDSCH based on a first dynamic CB mapping type.

At block 1320, the method 1300 optionally includes comparing the metric to a first threshold to determine that the first dynamic CB mapping type is not preferred by the UE. In some implementations, for example, the UE 104, the Rx processor 356, or the controller/processor 359 may execute the CB mapping preference component 140 or the metric component 148 to compare the metric 605 to a first threshold 610 to determine that the first dynamic CB mapping type is not preferred by the UE. That is, the metric component 148 may determine that a second dynamic CB mapping type is preferred by the UE. In some implementations, the metric component 148 may utilize a hysteresis to prevent switching preference between the first CB mapping type and the second CB mapping type. For instance, at block 1322, the method 1300 may optionally include determining that the first dynamic CB mapping type is preferred by the UE in response to the metric satisfying a second threshold 620.

At block 1330, the method 1300 may optionally include selecting the second CB mapping type based on a trained machine-learning model applied to the metric. For example, the metric component 148 may select the second CB mapping type based on the trained machine-learning model applied to the metric 605.

At block 1340, the method 1300 includes transmitting an indicator of a second CB mapping type that is preferred by the UE based on a metric. In some implementations, for example, the UE 104, the Tx processor 368, or the controller/processor 359 may execute the CB mapping preference component 140 or the indicator component 144 to transmit the indicator 630 of the second CB mapping type that is preferred by the UE based on the metric 605. In some implementations, the indicator 630 of the second CB mapping type is transmitted with a CSI report 740 based on the second CB mapping type (e.g., as in UCI 810 or UCI 820). In some implementations, the indicator 630 is transmitted within UCI 830 independently of a CSI report. In some implementations, the indicator 630 is a two-bit indicator with a value corresponding to the second CB mapping type. In some implementations, the indicator is a one-bit indicator of a request to change from the first dynamic CB mapping type. For example, the one-bit indicator may be transmitted per downlink resource allocation, and the first dynamic CB mapping type may be the dynamic CB mapping type for the resource allocation. As another example, the first dynamic CB mapping type may be a dynamic CB mapping type that is associated with the CSI report when the one-bit indicator is transmitted with the CSI report 740. In yet another example, the first dynamic CB mapping type may be a dynamic CB mapping type that is active in an uplink slot in which the one-bit indicator is transmitted when the first dynamic CB mapping type is indicated by the MAC-CE 712. In yet another example, the first dynamic CB mapping type may be the first dynamic CB mapping type that is used for a largest plurality 930 of PDSCH slots 910 for a time window 940 before an uplink slot 924 in which the one-bit indicator is transmitted when the first dynamic CB mapping type is indicated by a DCI 732. Accordingly, the UE 104, the Tx processor 368, or the controller/processor 359 executing the CB mapping preference component 140 or the indicator component 144 may provide means for transmitting an indicator of a second CB mapping type that is preferred by the UE based on a metric.

At block 1350, the method 1300 may optionally include transmitting a CSI report based on a current active dynamic CB mapping type. In some implementations, for example, the UE 104, the Tx processor 368, or the controller/processor 359 may execute the CB mapping preference component 140 or the CSI component 146 to transmit the CSI report 750 based on the current active dynamic CB mapping type. Accordingly, the UE 104, the Tx processor 368, or the controller/processor 359 executing the CB mapping preference component 140 or the indicator component 144 may provide means for transmitting a CSI report based on a current active dynamic CB mapping type.

Figure 14:
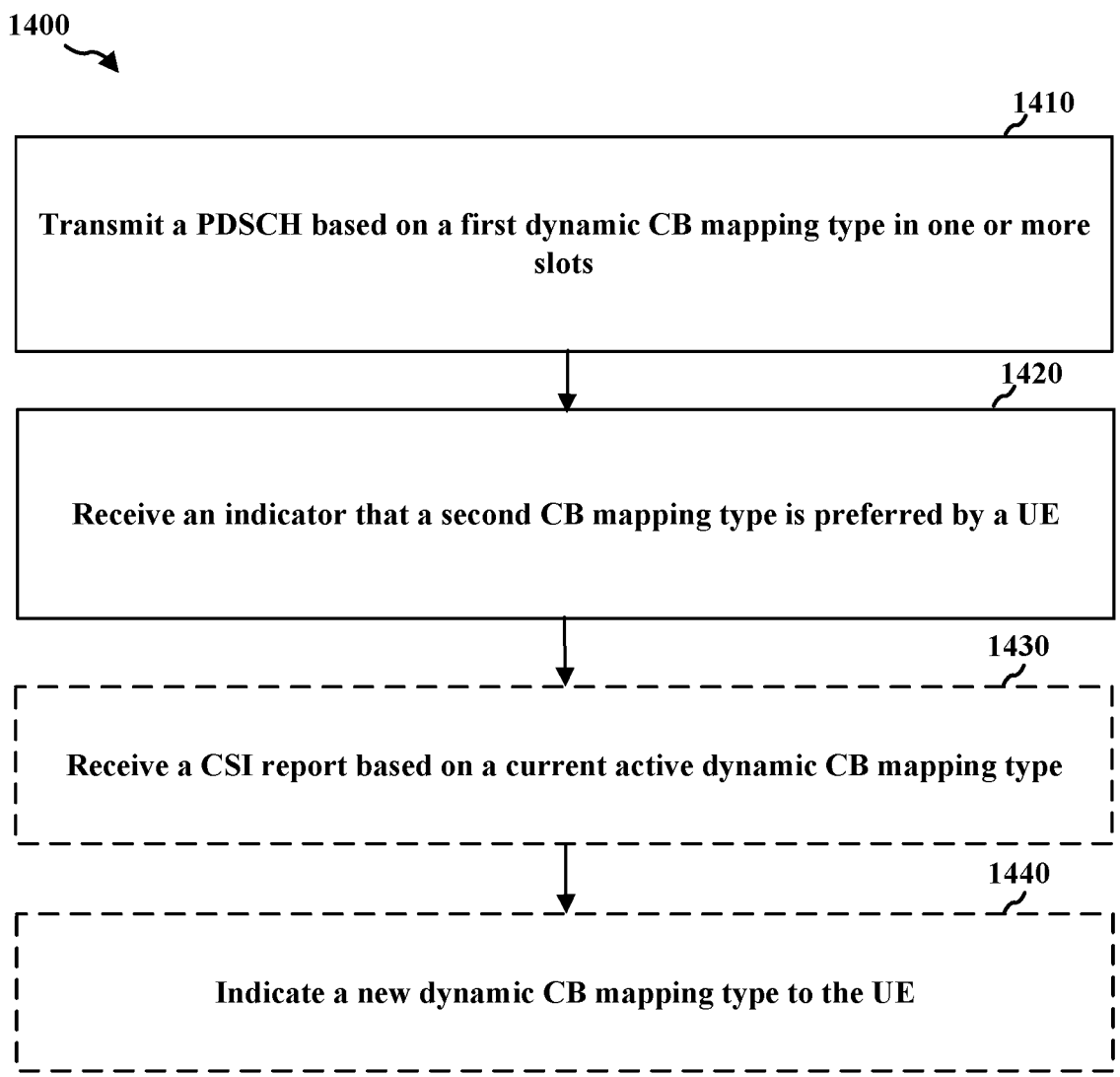
FIG. 14 a flowchart of an example method for a base station to consider UE preference when transmitting a physical downlink shared channel (PDSCH) with a dynamic CB mapping type.

FIG. 14 a flowchart of an example method 1400 for a base station to consider UE preference when transmitting a PDSCH with a dynamic CB mapping type. The method 1400 may be performed by a base station (such as the base station 102, which may include the memory 376 and which may be the entire base station 102 or a component of the base station 102 such as the CB mapping selection component 120, Tx processor 316, the Rx processor 370, or the controller/processor 375). The method 1400 may be performed by the CB mapping selection component 120 in communication with the CB mapping preference component 140 of the UE 104.

At block 1410, the method 1400 includes transmitting a PDSCH based on a first dynamic CB mapping type in one or more slots. In some implementations, for example, the base station 102, Tx processor 316, or the controller/processor 375 may execute the CB mapping selection component 120 or the CB mapping component 122 to transmit a PDSCH based on a first dynamic CB mapping type in one or more slots. Accordingly, the base station 102, Tx processor 316, or the controller/processor 375 executing the CB mapping selection component 120 or the CB mapping component 122 may provide means for transmitting a PDSCH based on a first dynamic CB mapping type in one or more slots.

At block 1420, the method 1400 includes receiving an indicator that a second CB mapping type is preferred by a UE. In some implementations, for example, the base station 102, Rx processor 370, or the controller/processor 375 may execute the CB mapping selection component 120 or the feedback component 124 to receive the indicator 630 that the second CB mapping type is preferred by the UE 104. In some implementations, the indicator of the second CB mapping type is received with a CSI report 740 based on the second CB mapping type. In some implementations, the indicator is received within UCI 830 independently of a CSI report. In some implementations, the indicator is a two-bit indicator with a value corresponding to the second CB mapping type. In some implementations, the indicator is a one-bit indicator of a request to change from the first dynamic CB mapping type. For example, the one-bit indicator may be received per downlink resource allocation, and the first dynamic CB mapping type may be the dynamic CB mapping type for the resource allocation. As another example, the first dynamic CB mapping type may be a dynamic CB mapping type that is associated with the CSI report when the one-bit indicator is received with the CSI report 740. In yet another example, the first dynamic CB mapping type may be a dynamic CB mapping type that is active in an uplink slot in which the one-bit indicator is received when the first dynamic CB mapping type is indicated by the MAC-CE 712. In yet another example, the first dynamic CB mapping type may be the first dynamic CB mapping type that is used for a largest plurality 930 of PDSCH slots 910 for a time window 940 before an uplink slot 924 in which the one-bit indicator is received when the first dynamic CB mapping type is indicated by a DCI 732. Accordingly, the base station 102, the Rx processor 370, or the controller/processor 375 executing the CB mapping selection component 120 or the feedback component 124 may provide means for receiving an indicator that a second CB mapping type is preferred by a UE.

At block 1430, the method 1400 may optionally include receiving a CSI report based on a current active dynamic CB mapping type. In some implementations, for example, the base station 102, Rx processor 370, or the controller/processor 375 may execute the CB mapping selection component 120 or the feedback component 124 to receive the CSI report 750 based on the current active dynamic CB mapping type. Accordingly, the base station 102, the Rx processor 370, or the controller/processor 375 executing the CB mapping selection component 120 or the feedback component 124 may provide means for receiving a CSI report based on a current active dynamic CB mapping type.

At block 1440, the method 1400 may optionally include indicating a new dynamic CB mapping type to the UE. In some implementations, for example, the base station 102, Tx processor 316, or the controller/processor 375 may execute the CB mapping selection component 120 or the notification component 126 to indicate a new dynamic CB mapping type to the UE. In some implementations, the new dynamic CB mapping type is based on the indicator and one or more of a scheduling scenario, CSI, downlink operational MCS and RI, channel delay spread, Doppler spread measurements, SNR measurements, reported UE speed, or reported UE Doppler measurements. Accordingly, the base station 102, Tx processor 316, or the controller/processor 375 executing the CB mapping selection component 120 or notification component 126 may provide means for indicating a new dynamic CB mapping type to the UE.

Some Further Example Clauses

Implementation examples are described in the following numbered clauses:

1. A method of wireless communication for a user equipment (UE), comprising:
   receiving a physical downlink shared channel (PDSCH) in one or more slots based on a first dynamic code block (CB) mapping type; and
   transmitting an indicator of a second CB mapping type that is preferred by the UE based on a metric.

2. The method of clause 1, wherein the indicator of the second CB mapping type is transmitted with a channel state information (CSI) report based on the second CB mapping type.

3. The method of clause 2, further comprising transmitting a CSI report based on a current active dynamic CB mapping type.

4. The method of any of clauses 1-3, wherein the indicator is transmitted within uplink control information (UCI) independently of a CSI report.

5. The method of any of clauses 1-4, wherein the metric is based on a combination of one or more of:
   channel state information reference signal (CSI-RS) measurements;
   tracking reference signal (TRS) measurements;
   channel correlation in time and frequency with received signal to noise ratio (SNR) measurements;
   estimation of decoding probability for each CB based on past allocations;
   deviations in decoding probability between different CBs of a transport block;
   differences in retransmissions per CB;
   differences in an average number of low density parity code (LDPC) decoding iterations per CB;
   information regarding UE impairments; or
   CB grouping enablement status and number of code block groups.

6. The method of any of clauses 1-5, further comprising selecting the second CB mapping type based on a trained machine-learning model applied to the metric.

7. The method of any of clauses 1-6, further comprising:
comparing the metric to a first threshold to determine that the first dynamic CB mapping type is not preferred by the UE; and
determining that the first dynamic CB mapping type is preferred by the UE in response to the metric satisfying a second threshold.

8. The method of any of clauses 1-7, wherein the indicator is a two-bit indicator with a value corresponding to the second CB mapping type.

9. The method of any of clauses 1-7, wherein the indicator is a one-bit indicator of a request to change from the first dynamic CB mapping type.

10. The method of clause 9, wherein the one-bit indicator is transmitted per downlink resource allocation and the first dynamic CB mapping type is the dynamic CB mapping type for the downlink resource allocation.

11. The method of clause 9, wherein the first dynamic CB mapping type is a dynamic CB mapping type that is associated with a CSI report when the one-bit indicator is transmitted with a CSI report.

12. The method of clause 9, wherein the first dynamic CB mapping type is a dynamic CB mapping type that is active in an uplink slot in which the one-bit indicator is transmitted when the first dynamic CB mapping type is indicated by a media access control (MAC) control element (CE).

13. The method of clause 9, wherein the first dynamic CB mapping type is the first dynamic CB mapping type that is used for a largest plurality of PDSCH slots for a time window before an uplink slot in which the one-bit indicator is transmitted when the first dynamic CB mapping type is indicated by a downlink control information (DCI).

14. A method of wireless communication for a base station, comprising:
transmitting a physical downlink shared channel (PDSCH) based on a first dynamic code block (CB) mapping type in one or more slots; and
receiving an indicator that a second CB mapping type is preferred by a user equipment (UE).

15. The method of clause 14, further comprising indicating a new dynamic CB mapping type to the UE.

16. The method of clause 15, wherein the new dynamic CB mapping type is based on the indicator and one or more of a scheduling scenario, channel state information (CSI), downlink operational modulation and coding scheme (MCS) and rank indicator (RI), channel delay spread, Doppler spread measurements, signal to noise ratio (SNR) measurements, reported UE speed, or reported UE Doppler measurements.

17. The method of any of clauses 14-16, wherein the indicator of the second CB mapping type is received with a channel state information (CSI) report based on the second CB mapping type.

18. The method of clause 17, further comprising receiving a CSI report based on a current active dynamic CB mapping type.

19. The method of any of clauses 14-16, wherein the indicator is received within uplink control information (UCI) independently of a CSI report.

20. The method of any of clauses 14-19, wherein the indicator is a two-bit indicator with a value corresponding to the second CB mapping type.

21. The method of any of clauses 14-19, wherein the indicator is a one-bit indicator of a request to change from the first dynamic CB mapping type.

22. The method of clause 21, wherein the one-bit indicator is received per resource allocation and the first dynamic CB mapping type is the dynamic CB mapping type for the resource allocation.

23. The method of clause 21, wherein the first dynamic CB mapping type is a dynamic CB mapping type that is associated with a CSI report when the one-bit indicator is received with the CSI report.

24. The method of any of clauses 21, wherein the first dynamic CB mapping type is a dynamic CB mapping type that is active in an uplink slot in which the one-bit indicator is received when the first dynamic CB mapping type is indicated by a media access control (MAC) control element (CE).

25. The method of clause 21, wherein the first dynamic CB mapping type is the first dynamic CB mapping type that is used for a largest plurality of PDSCH slots for a time window before an uplink slot in which the one-bit indicator is received when the first dynamic CB mapping type is indicated by a downlink control information (DCI).

26. An apparatus for wireless communication for a user equipment (UE), comprising:
a memory storing computer-executable instructions; and
at least one processor coupled to the memory and configured to execute the computer-executable instructions to perform the method of any of clauses 1-13.

27. An apparatus for wireless communication for a user equipment (UE), comprising means for performing the method of any of clauses 1-13.

28. A non-transitory computer-readable medium storing computer executable code, the code when executed by a processor of a user equipment (UE) causes the processor to perform the method of any of clauses 1-13.

29. An apparatus for wireless communication for a base station, comprising:
a memory storing computer-executable instructions; and
at least one processor coupled to the memory and configured to execute the computer-executable instructions to: perform the method of any of clauses 14-25.

30. An apparatus for wireless communication for a base station, comprising means for performing the method of any of clauses 14-25.

31. A non-transitory computer-readable medium storing computer executable code, the code when executed by a processor of a base station causes the processor to perform the method of any of clauses 14-25.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   receiving a physical downlink shared channel (PDSCH) in one or more slots based on a first dynamic code block (CB) mapping type; and
   transmitting an indicator of a second CB mapping type that is preferred by the UE based on a metric.

2. The method of claim 1, wherein the indicator of the second CB mapping type is transmitted with a channel state information (CSI) report based on the second CB mapping type.

3. The method of claim 2, further comprising transmitting a CSI report based on a current active dynamic CB mapping type.

4. The method of claim 1, wherein the indicator is transmitted within uplink control information (UCI) independently of a CSI report.

5. The method of claim 1, wherein the metric is based on a combination of one or more of:
   channel state information reference signal (CSI-RS) measurements;
   tracking reference signal (TRS) measurements;
   channel correlation in time and frequency with received signal to noise ratio (SNR) measurements;
   estimation of decoding probability for each CB based on past allocations;
   deviations in decoding probability between different CBs of a transport block;
   differences in retransmissions per CB;
   differences in an average number of low density parity code (LDPC) decoding iterations per CB;
   information regarding UE impairments; or
   CB grouping enablement status and number of code block groups.

6. The method of claim 1, further comprising selecting the second CB mapping type based on a trained machine-learning model applied to the metric.

7. The method of claim 1, further comprising:
   comparing the metric to a first threshold to determine that the first dynamic CB mapping type is not preferred by the UE; and
   determining that the first dynamic CB mapping type is preferred by the UE in response to the metric satisfying a second threshold.

8. The method of claim 1, wherein the indicator is a two-bit indicator with a value corresponding to the second CB mapping type.

9. The method of claim 1, wherein the indicator is a one-bit indicator of a request to change from the first dynamic CB mapping type.

10. The method of claim 9, wherein the one-bit indicator is transmitted per downlink resource allocation and the first dynamic CB mapping type is the dynamic CB mapping type for the downlink resource allocation.

11. The method of claim 9, wherein the first dynamic CB mapping type is a dynamic CB mapping type that is associated with a CSI report when the one-bit indicator is transmitted with a CSI report.

12. The method of claim 9, wherein the first dynamic CB mapping type is a dynamic CB mapping type that is active in an uplink slot in which the one-bit indicator is transmitted when the first dynamic CB mapping type is indicated by a media access control (MAC) control element (CE).

13. The method of claim 9, wherein the first dynamic CB mapping type is the first dynamic CB mapping type that is used for a largest plurality of PDSCH slots for a time window before an uplink slot in which the one-bit indicator is transmitted when the first dynamic CB mapping type is indicated by a downlink control information (DCI).

14. A method of wireless communication for a base station, comprising:
   transmitting a physical downlink shared channel (PDSCH) based on a first dynamic code block (CB) mapping type in one or more slots; and
   receiving an indicator that a second CB mapping type is preferred by a user equipment (UE).

15. The method of claim 14, further comprising indicating a new dynamic CB mapping type to the UE.

16. The method of claim 15, wherein the new dynamic CB mapping type is based on the indicator and one or more of a scheduling scenario, channel state information (CSI), downlink operational modulation and coding scheme (MCS) and rank indicator (RI), channel delay spread, Doppler spread measurements, signal to noise ratio (SNR) measurements, reported UE speed, or reported UE Doppler measurements.

17. The method of claim 14, wherein the indicator of the second CB mapping type is received with a channel state information (CSI) report based on the second CB mapping type.

18. The method of claim 17, further comprising receiving a CSI report based on a current active dynamic CB mapping type.

19. The method of claim 14, wherein the indicator is received within uplink control information (UCI) independently of a CSI report.

20. The method of claim 14, wherein the indicator is a two-bit indicator with a value corresponding to the second CB mapping type.

21. The method of claim 14, wherein the indicator is a one-bit indicator of a request to change from the first dynamic CB mapping type.

22. The method of claim 21, wherein the one-bit indicator is received per resource allocation and the first dynamic CB mapping type is the dynamic CB mapping type for the resource allocation.

23. The method of claim 21, wherein the first dynamic CB mapping type is a dynamic CB mapping type that is associated with a CSI report when the one-bit indicator is received with the CSI report.

24. The method of claim 21, wherein the first dynamic CB mapping type is a dynamic CB mapping type that is active in an uplink slot in which the one-bit indicator is received when the first dynamic CB mapping type is indicated by a media access control (MAC) control element (CE).

25. The method of claim 21, wherein the first dynamic CB mapping type is the first dynamic CB mapping type that is used for a largest plurality of PDSCH slots for a time window before an uplink slot in which the one-bit indicator is received when the first dynamic CB mapping type is indicated by a downlink control information (DCI).

26. An apparatus for wireless communication for a user equipment (UE), comprising:
a memory storing computer-executable instructions; and
at least one processor coupled to the memory and configured to execute the computer-executable instructions to:
receive a physical downlink shared channel (PDSCH) in one or more slots based on a first dynamic code block (CB) mapping type; and
transmit an indicator of a second CB mapping type that is preferred by the UE based on a metric.

27. The apparatus of claim 26, wherein the indicator of the second CB mapping type is transmitted with a channel state information (CSI) report based on the second CB mapping type.

28. The apparatus of claim 26, wherein the indicator is transmitted within uplink control information (UCI) independently of a CSI report.

29. The apparatus of claim 26, wherein the indicator is a two-bit indicator with a value corresponding to the second CB mapping type or a one-bit indicator of a request to change from the first dynamic CB mapping type.

30. An apparatus for wireless communication for a base station, comprising:
a memory storing computer-executable instructions; and
at least one processor coupled to the memory and configured to execute the computer-executable instructions to:
transmit a physical downlink shared channel (PDSCH) based on a first dynamic code block (CB) mapping type in one or more slots; and
receive an indicator that a second CB mapping type is preferred by a user equipment (UE).

31. The apparatus of claim 30, wherein the indicator of the second CB mapping type is received with a channel state information (CSI) report based on the second CB mapping type.

32. The apparatus of claim 30, wherein the indicator is received within uplink control information (UCI) independently of a CSI report.

33. The apparatus of claim 30, wherein the indicator is a two-bit indicator with a value corresponding to the second CB mapping type or a one-bit indicator of a request to change from the first dynamic CB mapping type.

34. An apparatus for wireless communication for a user equipment (UE), comprising:
means for receiving a physical downlink shared channel (PDSCH) in one or more slots based on a first dynamic code block (CB) mapping type; and
means for transmitting an indicator of a second CB mapping type that is preferred by the UE based on a metric.

35. The apparatus of claim 34, wherein the indicator of the second CB mapping type is transmitted with a channel state information (CSI) report based on the second CB mapping type.

36. The apparatus of claim 34, wherein the indicator is transmitted within uplink control information (UCI) independently of a CSI report.

37. The apparatus of claim 34, wherein the indicator is a two-bit indicator with a value corresponding to the second CB mapping type or a one-bit indicator of a request to change from the first dynamic CB mapping type.

38. An apparatus for wireless communication for a base station, comprising:
means for transmitting a physical downlink shared channel (PDSCH) based on a first dynamic code block (CB) mapping type in one or more slots; and
means for receiving an indicator that a second CB mapping type is preferred by a user equipment (UE).

39. The apparatus of claim 38, wherein the indicator of the second CB mapping type is received with a channel state information (CSI) report based on the second CB mapping type.

40. The apparatus of claim 38, wherein the indicator is received within uplink control information (UCI) independently of a CSI report.

41. The apparatus of claim 38, wherein the indicator is a two-bit indicator with a value corresponding to the second CB mapping type or a one-bit indicator of a request to change from the first dynamic CB mapping type.

42. A non-transitory computer-readable medium storing computer executable code, the code when executed by a processor of a user equipment (UE) causes the processor to:
receive a physical downlink shared channel (PDSCH) in one or more slots based on a first dynamic code block (CB) mapping type; and
transmit an indicator of a second CB mapping type that is preferred by the UE based on a metric.

43. The non-transitory computer-readable medium of claim 42, wherein the indicator is a two-bit indicator with a value corresponding to the second CB mapping type or a one-bit indicator of a request to change from the first dynamic CB mapping type.

44. A non-transitory computer-readable medium storing computer executable code, the code when executed by a processor of a base station causes the processor to:
transmit a physical downlink shared channel (PDSCH) based on a first dynamic code block (CB) mapping type in one or more slots; and
receive an indicator that a second CB mapping type is preferred by a user equipment (UE).

45. The non-transitory computer-readable medium of claim 44, wherein the indicator is a two-bit indicator with a value corresponding to the second CB mapping type or a one-bit indicator of a request to change from the first dynamic CB mapping type.

* * * * *